(12) United States Patent
Kelly

(10) Patent No.: US 9,311,771 B2
(45) Date of Patent: Apr. 12, 2016

(54) PRESENTING AUTOSTEREOSCOPIC GAMING CONTENT ACCORDING TO VIEWER POSITION

(71) Applicant: WMS Gaming, Inc., Waukegan, IL (US)

(72) Inventor: Sean P. Kelly, Chicago, IL (US)

(73) Assignee: Bally Gaming, Inc., Las Vegas, NV (US)

( * ) Notice: Subject to any disclaimer, the term of this patent is extended or adjusted under 35 U.S.C. 154(b) by 286 days.

(21) Appl. No.: 13/787,039

(22) Filed: Mar. 6, 2013

(65) Prior Publication Data
US 2014/0066178 A1 Mar. 6, 2014

Related U.S. Application Data

(60) Provisional application No. 61/694,090, filed on Aug. 28, 2012.

(51) Int. Cl.
*G07F 17/32* (2006.01)
*H04N 13/04* (2006.01)
*H04N 13/02* (2006.01)

(52) U.S. Cl.
CPC ........ *G07F 17/3211* (2013.01); *G07F 17/3241* (2013.01); *H04N 13/02* (2013.01); *H04N 13/04* (2013.01)

(58) Field of Classification Search
CPC ........... G07F 17/3211; H04N 13/0459; H04N 13/0022; H04N 13/0409; H04N 13/0275; H04N 13/0225
See application file for complete search history.

(56) References Cited

U.S. PATENT DOCUMENTS

| 7,857,700 | B2 | 12/2010 | Wilder et al. | |
|---|---|---|---|---|
| 8,531,452 | B2 | 9/2013 | Inoue et al. | |
| 2004/0266536 | A1* | 12/2004 | Mattice et al. | 463/43 |
| 2005/0059487 | A1 | 3/2005 | Wilder et al. | |
| 2009/0009593 | A1* | 1/2009 | Cameron et al. | 348/51 |
| 2009/0061983 | A1 | 3/2009 | Kaufman | |
| 2011/0018868 | A1 | 1/2011 | Inoue et al. | |
| 2011/0109629 | A1* | 5/2011 | Ericson et al. | 345/423 |
| 2012/0306869 | A1 | 12/2012 | Ozaki | |

(Continued)

FOREIGN PATENT DOCUMENTS

| CN | 101961555 | 2/2011 |
|---|---|---|
| CN | 101961556 | 2/2011 |
| JP | 2001273517 | 10/2001 |
| JP | 2002140724 | 5/2002 |

(Continued)

*Primary Examiner* — Jason Skaarup
(74) *Attorney, Agent, or Firm* — DeLizio Law, PLLC

(57) ABSTRACT

A wagering game system and its operations are described herein. In some embodiments, the operations can include determining a position of a player in physical world space ("player's position") in front of an autostereoscopic display ("display"). The display includes optical units configured to project views of wagering game content with an autostereoscopic, three-dimensional effect. The operations can further include performing a repeating subroutine for each of the optical units associated with the wagering game content. The repeating subroutine, for each one of the optical units, determines that one of the views has a viewing angle that corresponds to the player's position, configures a virtual camera in virtual world space according to the viewing angle and renders, based on configuration of the virtual camera, a portion of the wagering game content that corresponds to pixels of the autostereoscopic display associated with the one of the optical units.

26 Claims, 25 Drawing Sheets

(56) References Cited

U.S. PATENT DOCUMENTS

| | | |
|---|---|---|
| 2013/0231184 A1 | 9/2013 | Hatanaka |
| 2013/0281206 A1 | 10/2013 | Lyons et al. |
| 2013/0281207 A1 | 10/2013 | Lyons et al. |
| 2013/0281208 A1 | 10/2013 | Lyons et al. |
| 2013/0281209 A1 | 10/2013 | Lyons et al. |

FOREIGN PATENT DOCUMENTS

| | | |
|---|---|---|
| JP | 2011024635 | 2/2011 |
| JP | 2011024636 | 2/2011 |
| JP | 2011024639 | 2/2011 |
| WO | WO 2005009052 A1 * | 1/2005 |
| WO | WO-2009029720 | 3/2009 |

* cited by examiner

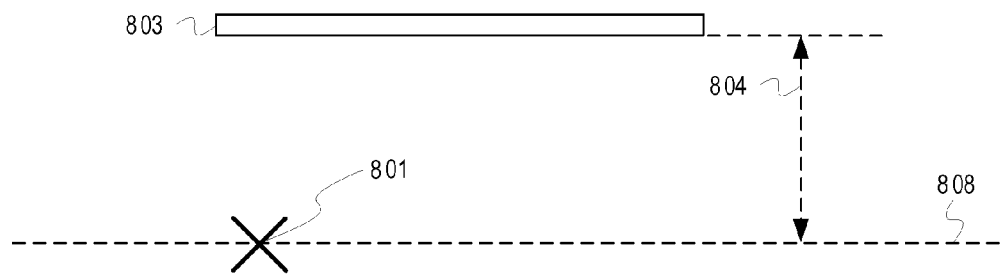
FIG. 8A
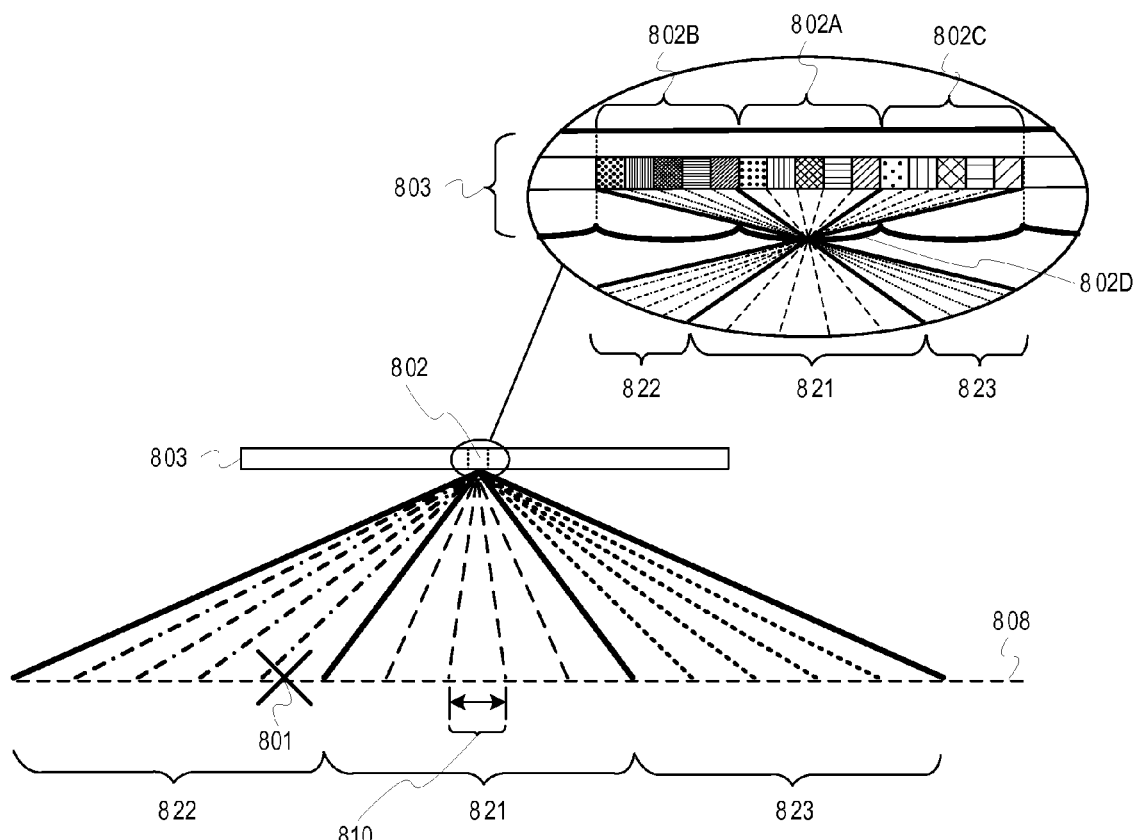
FIG. 8B
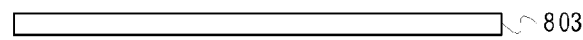
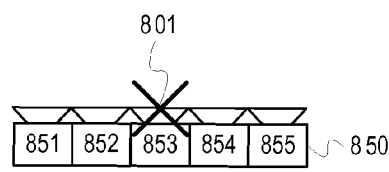
FIG. 8C

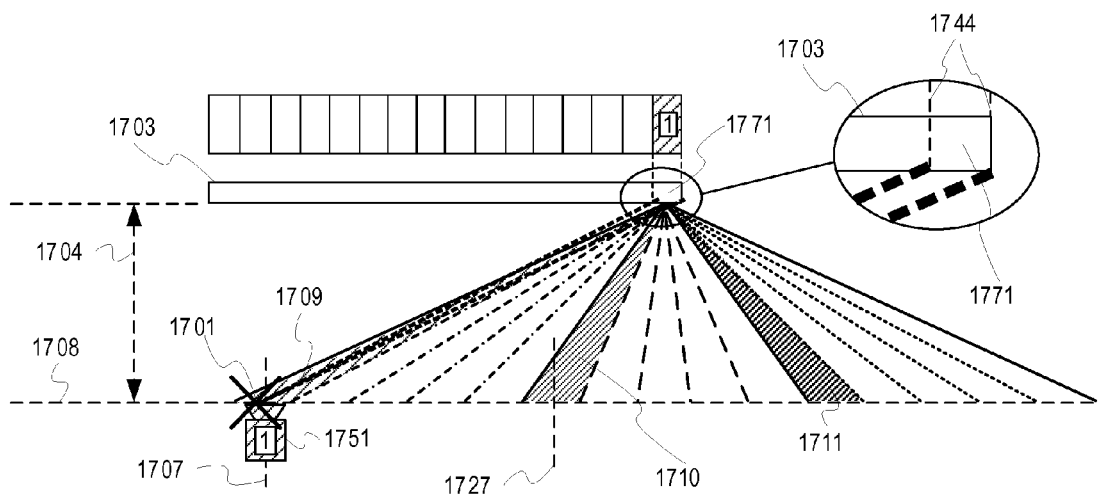
FIG. 17A
FIG. 17B
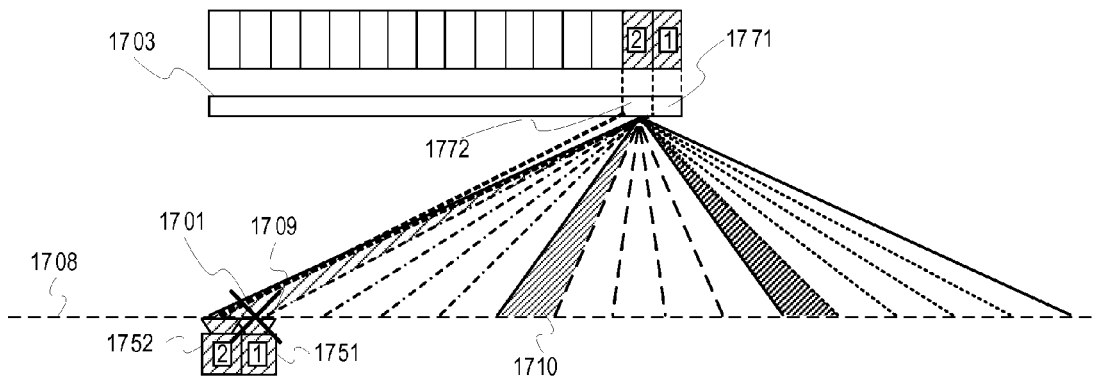
FIG. 17C

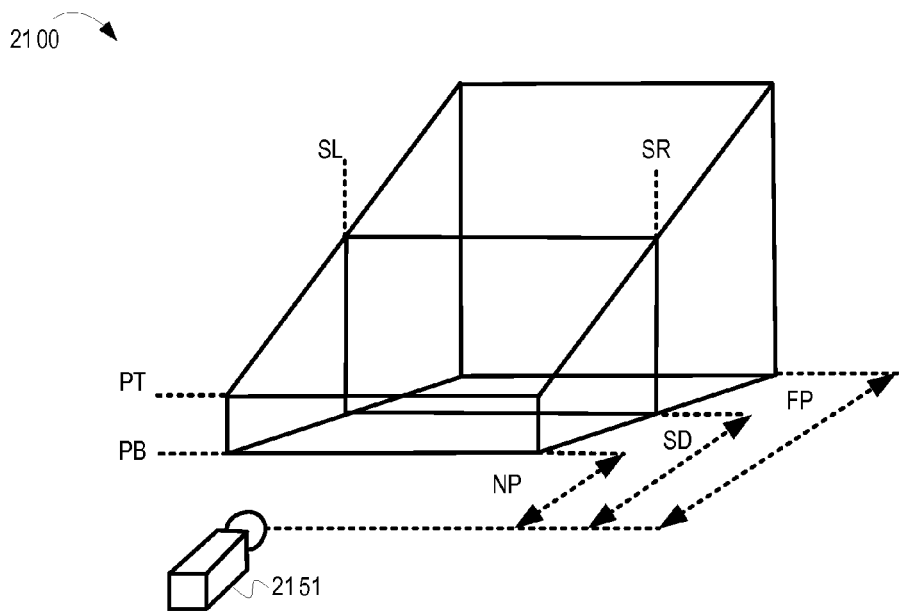

NP = NEAR CLIPPING-PLANE DISTANCE
FP = FAR CLIPPING-PLANE DISTANCE
SD = VIEWER-SCREEN DISTANCE
SL = ORTHOGRAPHIC BOX LEFT EDGE AT SCREENPLANE
SR = ORTHOGRAPHIC BOX RIGHT EDGE AT SCREENPLANE
PT = PERSPECTIVE FRUSTUM NEAR-CLIP-PLANE TOP COORDINATE
PB = PERSPECTIVE FRUSTUM NEAR-CLIP-PLANE BOTTOM COORDINATE $$\begin{bmatrix} \frac{2}{(SR-SL)} & 0 & \frac{(SR+SL)}{(SD*(SR-SL))} & 0 \\ 0 & \frac{2*NP}{(PT-PB)} & \frac{(PT+PB)}{(PT-PB)} & 0 \\ 0 & 0 & \frac{-(FP+NP)}{(FP-NP)} & \frac{-(2*FP*NP)}{(FP-NP)} \\ 0 & 0 & -1 & 0 \end{bmatrix}$$ ~2105

FIG. 21

PRESENTING AUTOSTEREOSCOPIC GAMING CONTENT ACCORDING TO VIEWER POSITION

LIMITED COPYRIGHT WAIVER

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2013, WMS Gaming, Inc.

TECHNICAL FIELD

Embodiments of the inventive subject matter relate generally to wagering game systems and networks that, more particularly, present autostereoscopic gaming content according to viewer position.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

One way to add visual appeal to wagering games is to present wagering game content using stereoscopic three-dimensional graphics. Stereoscopic three-dimensional graphics appear to have depth, so that graphical objects appear to hover in space, in front of displays. One way to present graphics with a stereoscopic three-dimensional effect (3D) is to utilize an autostereoscopic display. An autostereoscopic display can present content in 3D ("3D content") to a user without requiring the user to wear special 3D glasses or headgear. Some autostereoscopic 3D displays concurrently present the same 3D image at various viewing angles. In other words, the autostereoscopic 3D display concurrently presents a number of 3D views at different viewing angles. Viewing angles are the angles at which various perspectives of the content are projected outward from the display based on a location and/or orientation of optical units on the display (e.g., based on the placement and configuration of lenticular lenses on the viewing surface of the display). At any given time, a same number of persons could concurrently see the 3D image of the content presented on the display if those persons are aligned with the viewing angles.

However, some autostereoscopic 3D displays have specific challenges. In between the viewing angles, or in other words in the viewing areas where the image of the content transitions from one view (i.e., from one viewing angle) to the next, there are distorted areas where the image appears cut-off, degraded, or overlapped. Another issue that autostereoscopic 3D displays encounter is that presentation of an optimal image of the content depends on how far away a person is positioned in relation to a face of the display. For instance, the transitions between viewing angles are very close to each other near the face of the display. Therefore, if a person is close to the face of the display, when the person moves to the side that player's eyes will quickly encounter a distorted area. If a player is far away from the display then edges of the content can appear cut off. The challenges with autostereoscopic displays can diminish the gaming experience for gaming patrons. Therefore, gaming manufacturers, casinos, and the like, would greatly benefit from resolution to such challenges.

BRIEF DESCRIPTION OF THE DRAWING(S)

Embodiments are illustrated in the Figures of the accompanying drawings in which.

Figure 4:
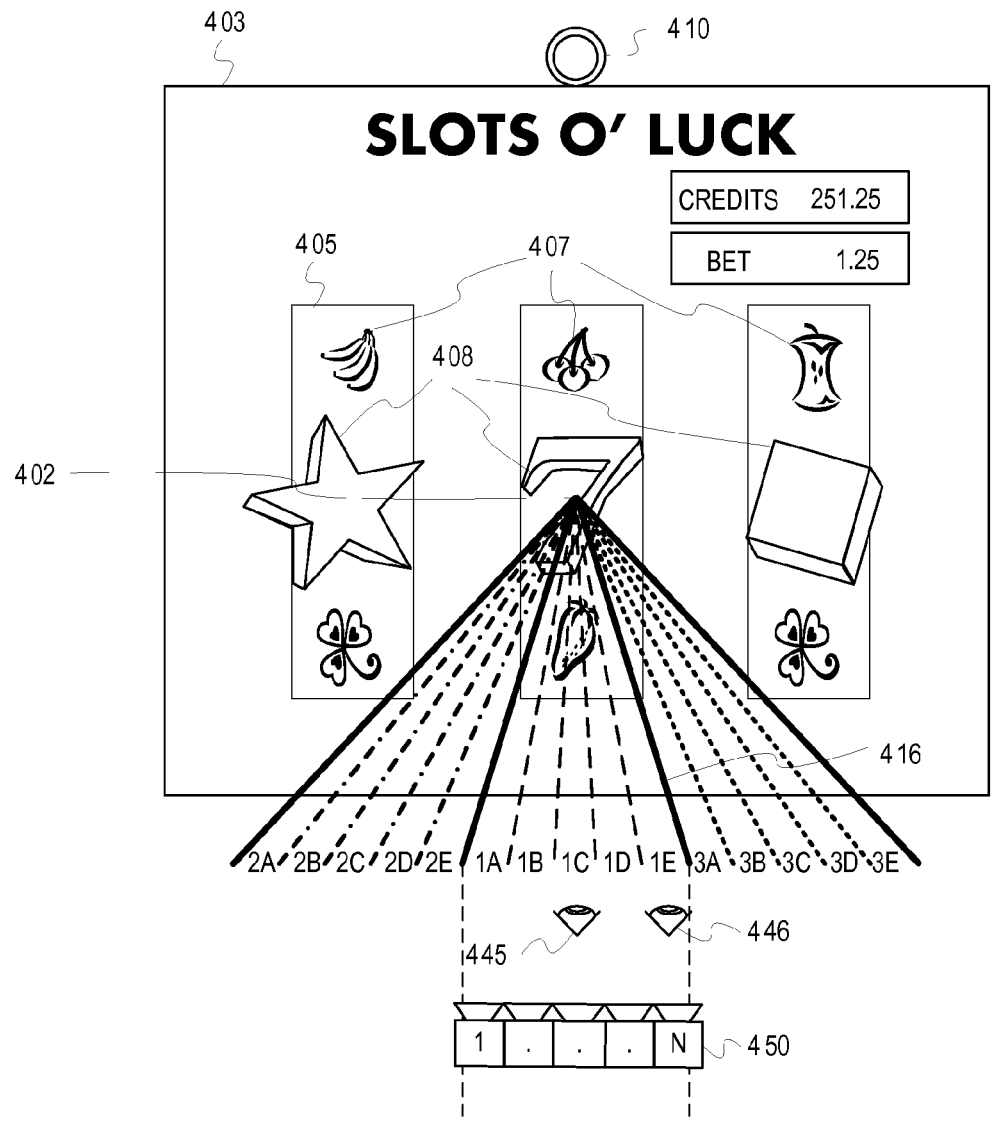
Figure 5:
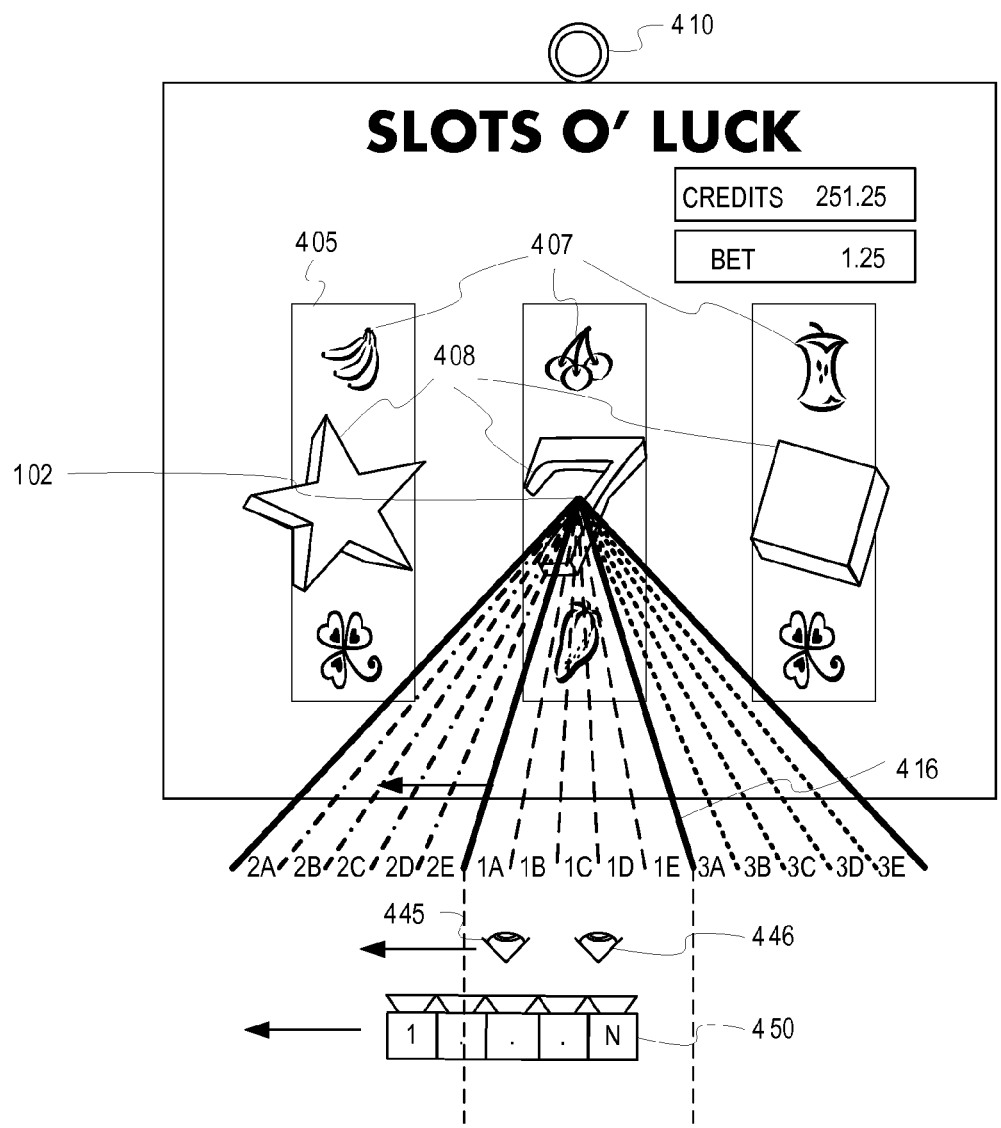
Figure 6:
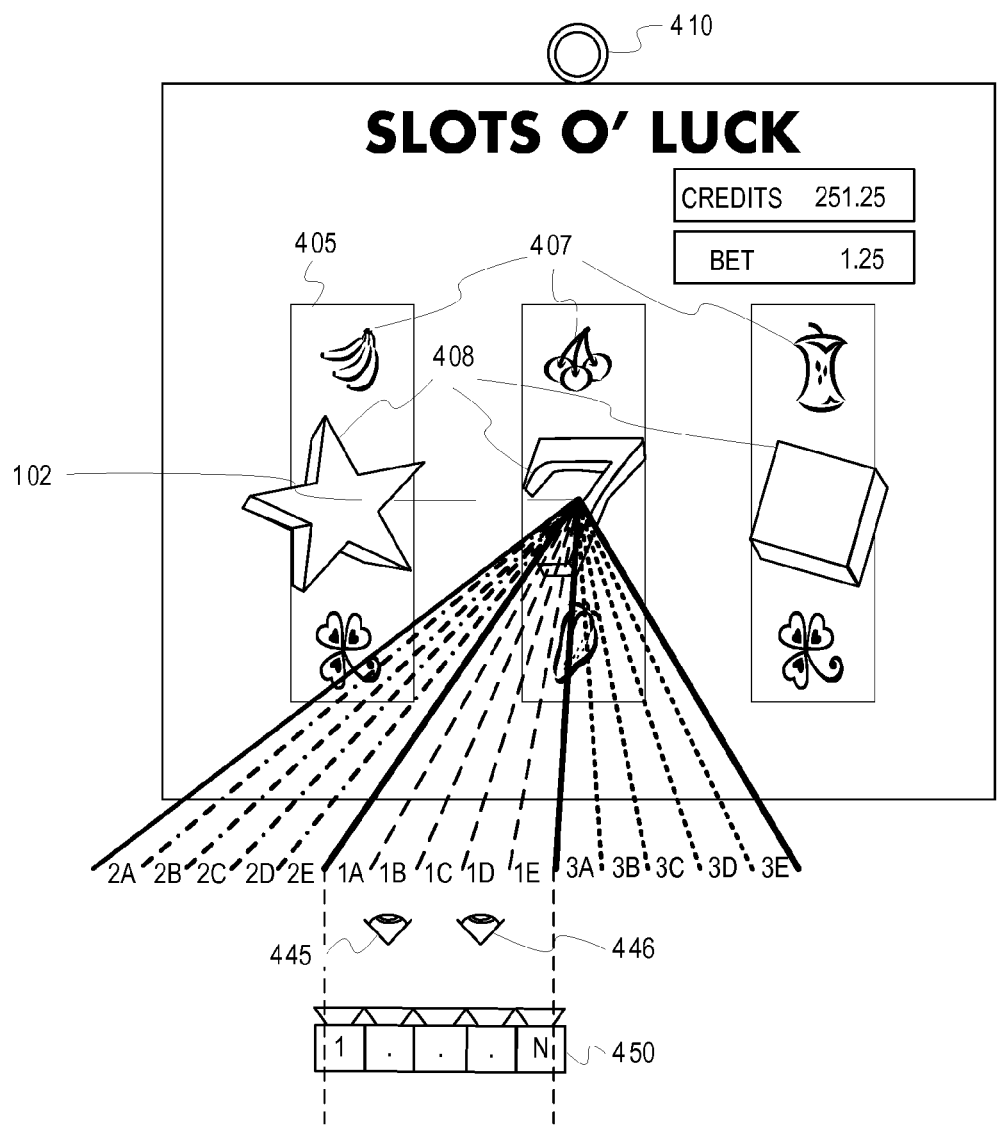
Figure 7:
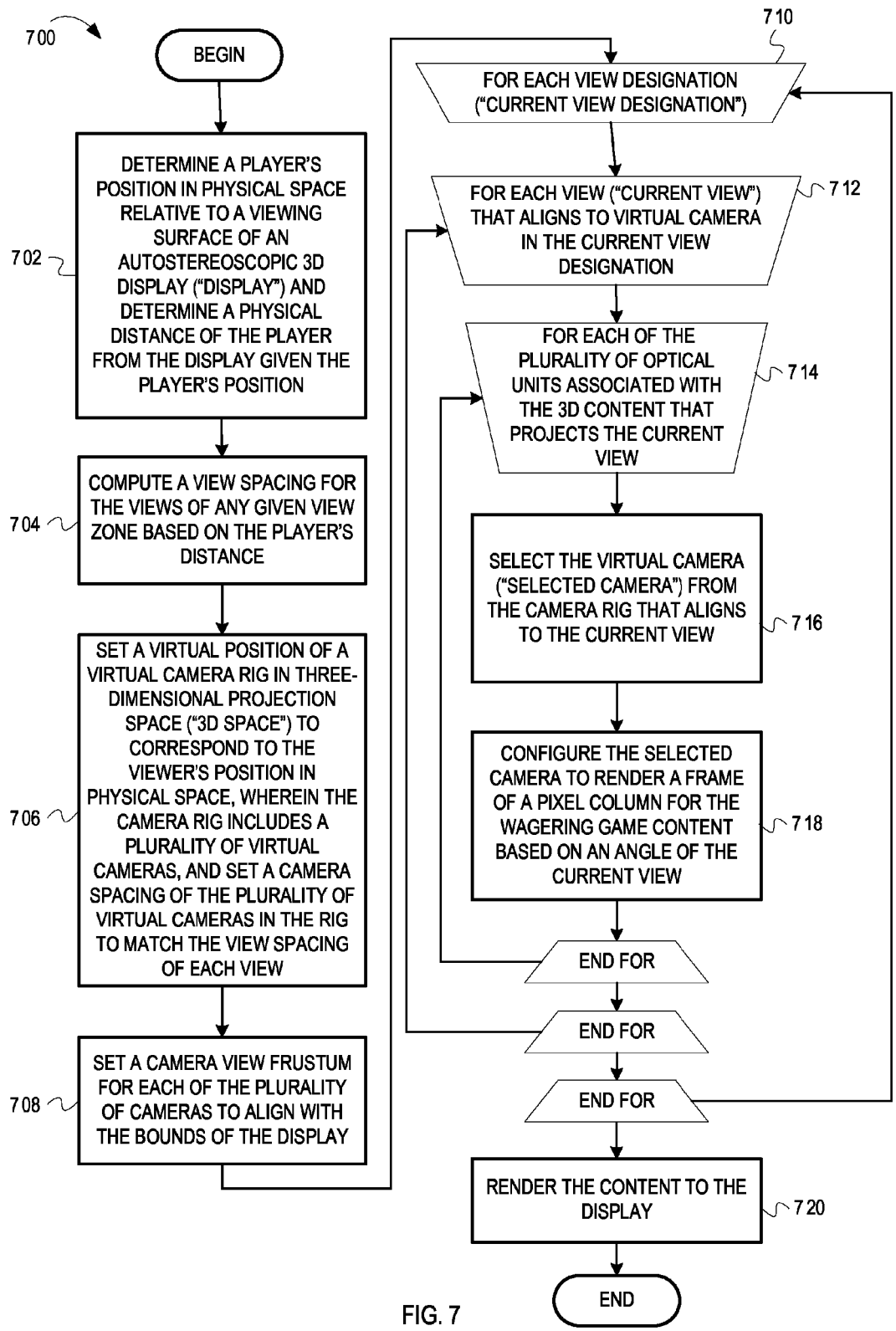
Figure 16:
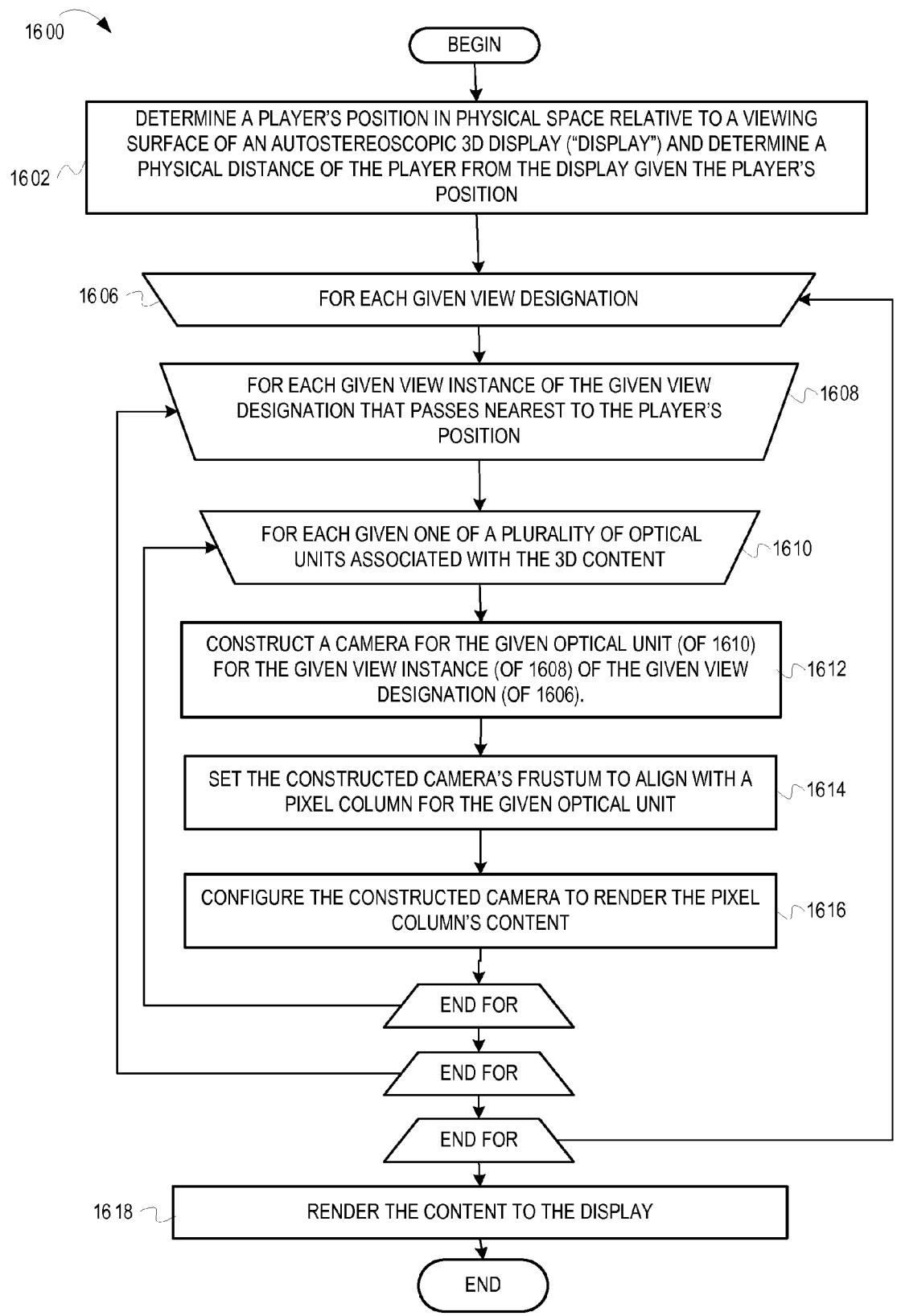
Figure 18A:
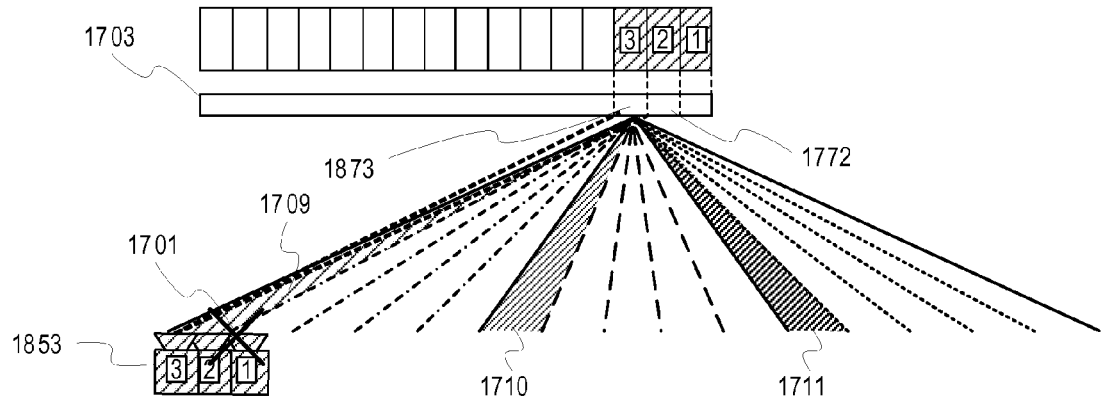
Figure 18B:
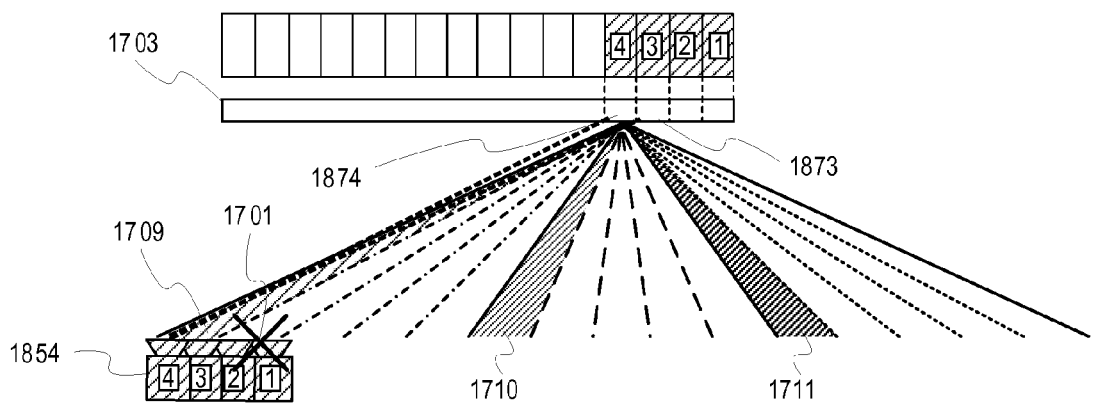
Figure 18C:
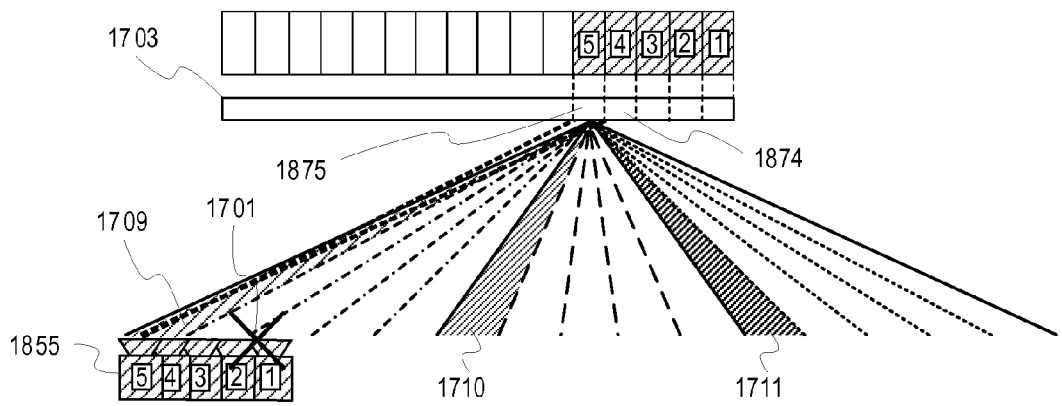
Figure 22:
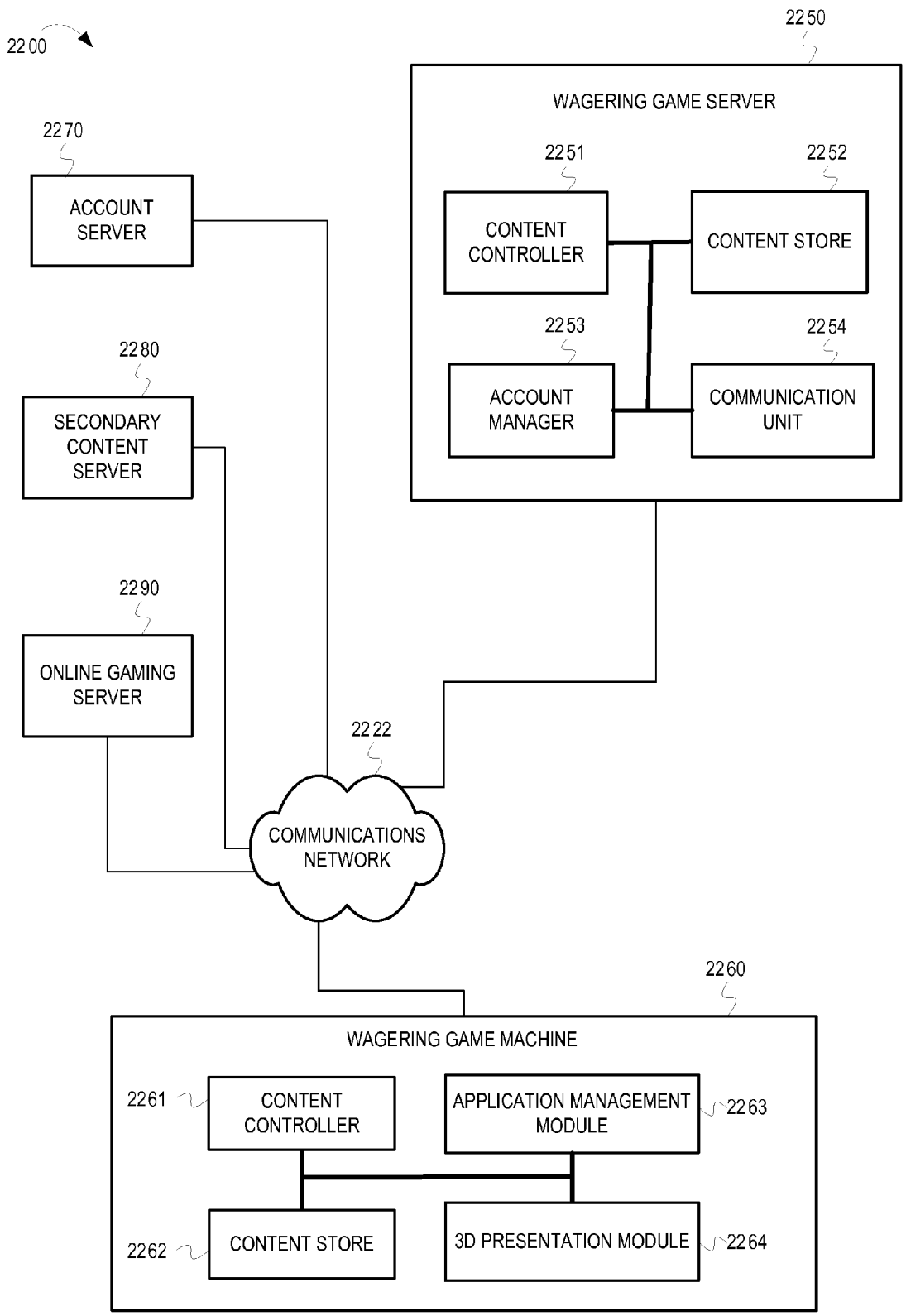
Figure 23A:
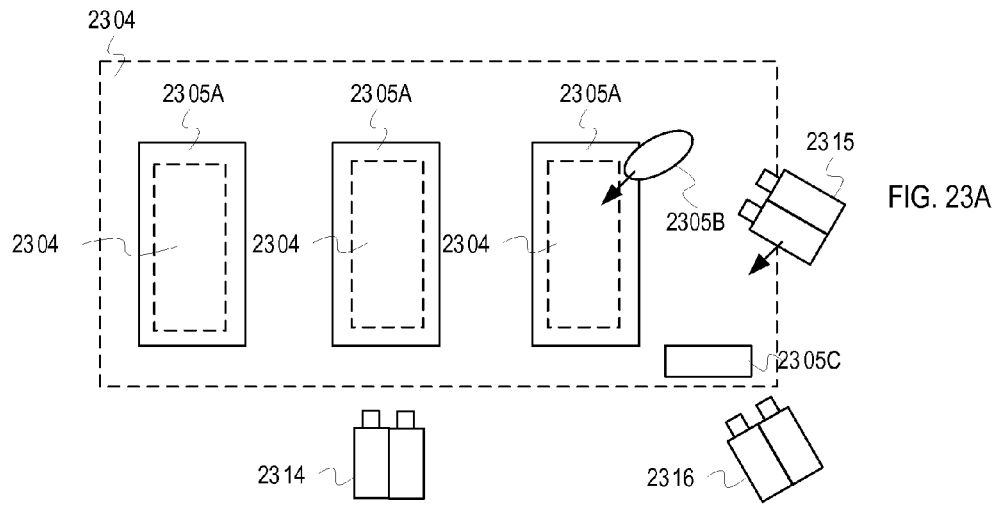
Figure 23B:
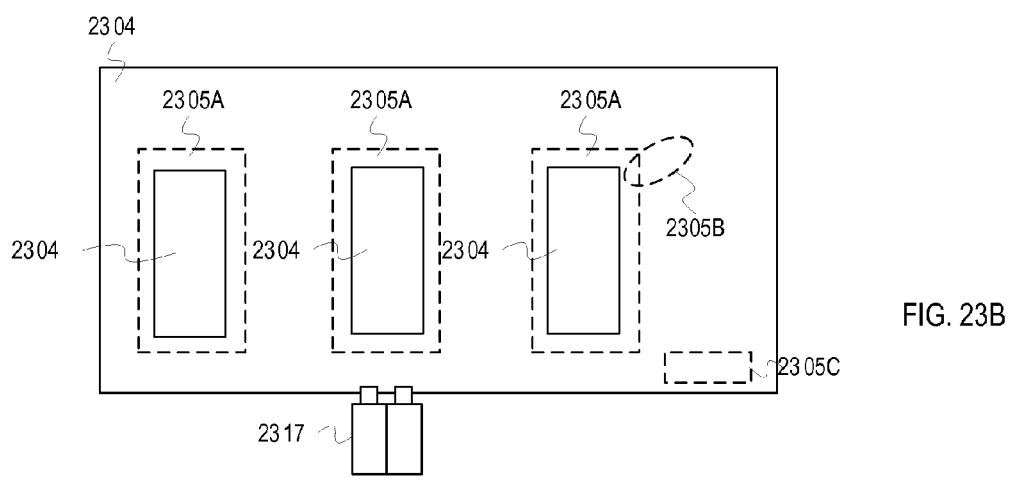
Figure 23C:
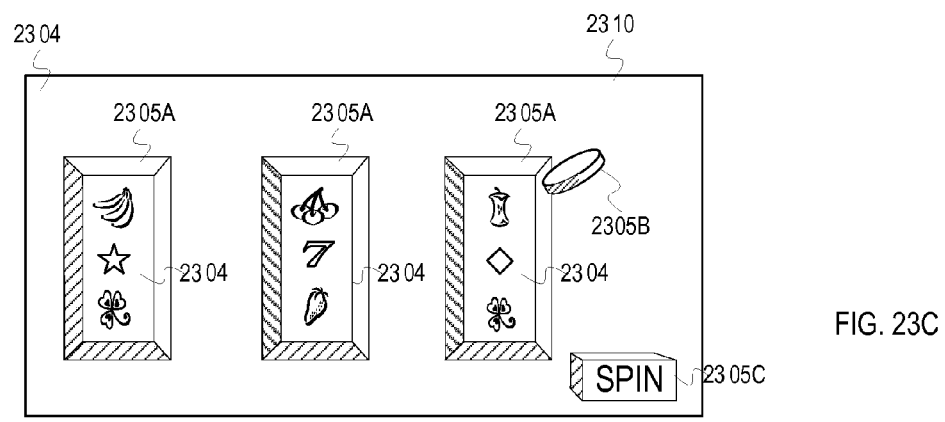
Figure 24:
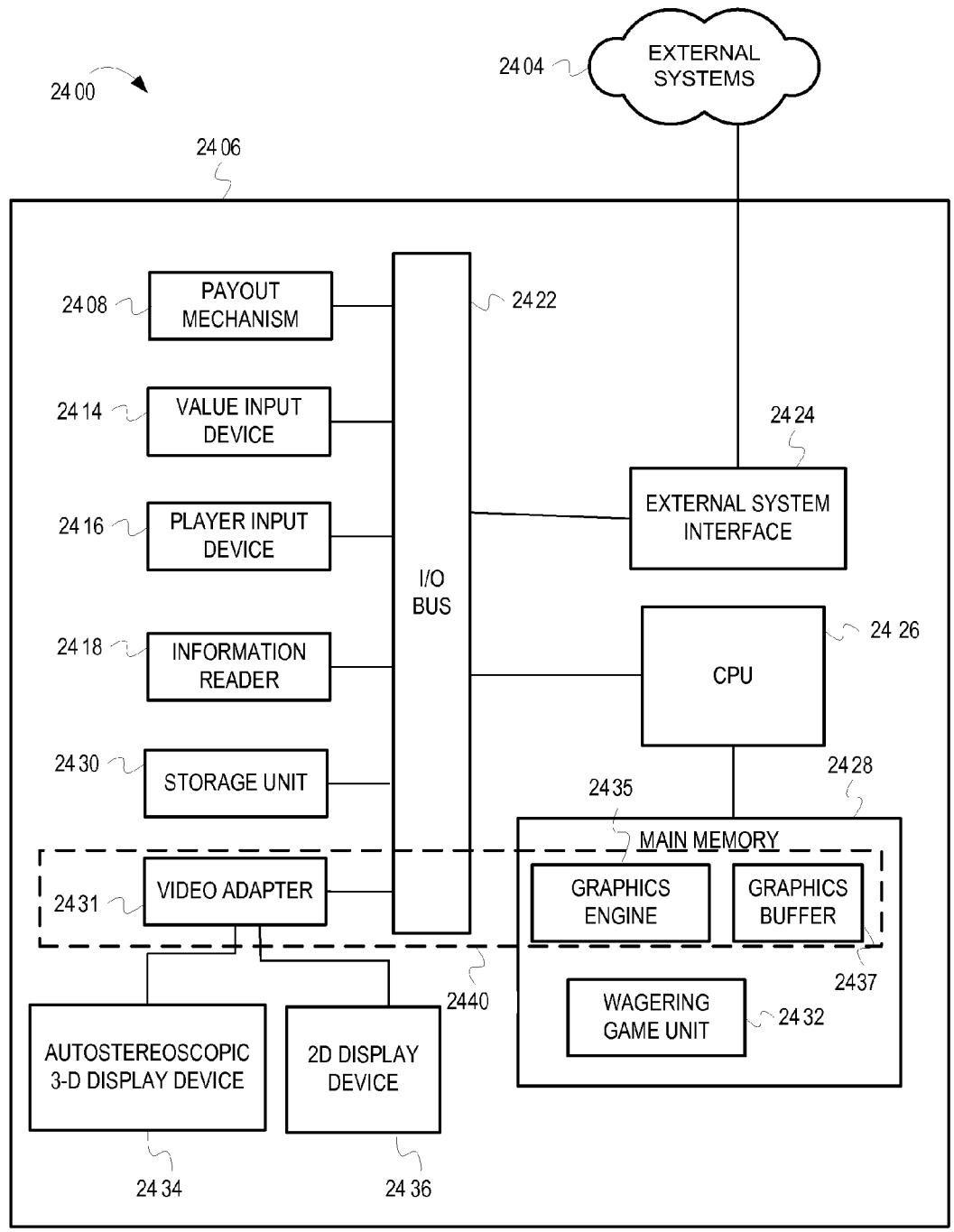
Figure 25:
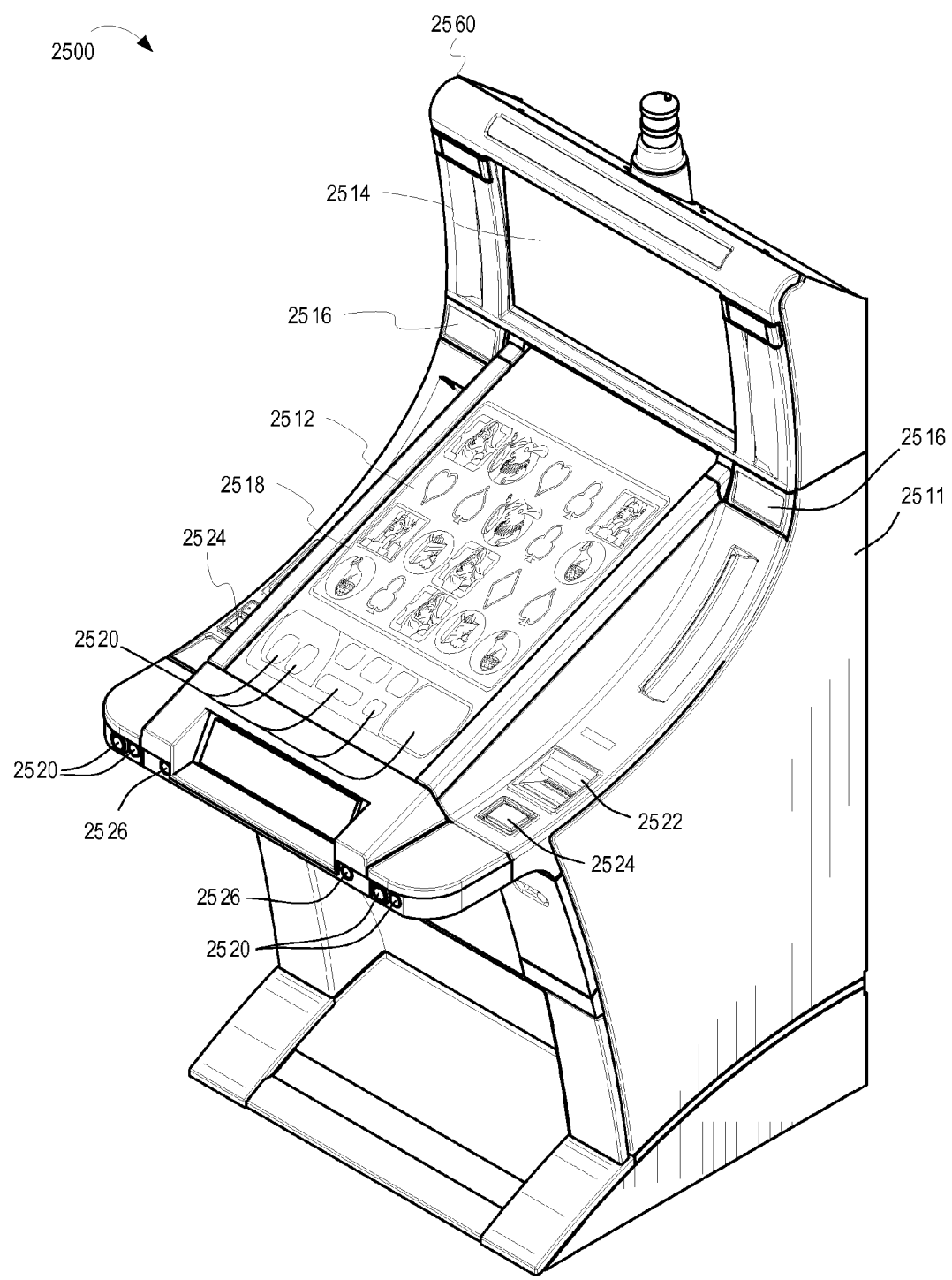

FIGS. 4, 5, and 6 are illustrations of presenting autostereoscopic gaming content according to viewer position, according to some embodiments;

FIG. 7 is a flow diagram 700 illustrating presenting autostereoscopic gaming content according to viewer position, according to some embodiments;

FIGS. 8A, 8B, 8C, 9A, 9B, 10A, 10B, 11A, 11B, 12A, 12B, 13A, 13B, 14A, 14B, 15A, 15B, and 15C are illustrations of presenting autostereoscopic gaming content according to viewer position, according to some embodiments;

FIG. 16 is a flow diagram 1600 illustrating presenting autostereoscopic gaming content according to viewer position, according to some embodiments;

FIGS. 17A, 17B, 17C, 18A, 18B, 18C, 19A, 19B, 19C, 20A and 20B are illustrations of presenting autostereoscopic gaming content according to viewer position, according to some embodiments;

FIG. 21 is an illustration of a wagering game system 2100, according to some embodiments;

FIG. 22 is an illustration of a wagering game system architecture 2200, according to some embodiments;

FIGS. 23A-23C are illustrations of generating 3D wagering game content, according to some embodiments;

FIG. 24 is an illustration of a wagering game machine architecture 2400, according to some embodiments; and FIG. 25 is an illustration of a wagering game system 2500, according to some embodiments.

DESCRIPTION OF ILLUSTRATIVE EMBODIMENTS

This description of the embodiments is divided into six sections. The first section provides an introduction to embodiments. The second section describes example operations performed by some embodiments. The third section describes additional example embodiments while the fourth section describes example operating environments. The fifth section presents some general comments.

Introduction

This section provides an introduction to some embodiments.

As described previously, use of autostereoscopic displays for gaming faces certain challenges. Some embodiments, however, address the challenges by rendering autostereoscopic content based on a player's position relative to the display, when the player moves forward, backward, left, or right relative to an autostereoscopic 3D display. Some embodiments, therefore, present a three-dimensional image of wagering game content on an autostereoscopic display ("display") based on any position that the player may be in while in front of the display, as opposed to presenting the content as would appear based on the assumption that the player is always centered in front of the display. Some embodiments, therefore, eliminate, or at least significantly reduce or minimize, distorted effects associated with player movement. This introduction will first describe an example autostereoscopic display, in FIGS. 1 and 2, as well as some challenges associated with movement by a player in front of the autostereoscopic display. Next, in FIGS. 3, 4, 5 and 6, the introduction will present a high-level description of some embodiments that address the challenges. Additional figures, in other sections of this description, will address additional embodiments related to some of the high-level description in FIGS. 3, 4, 5, and 6.

Figure 1:
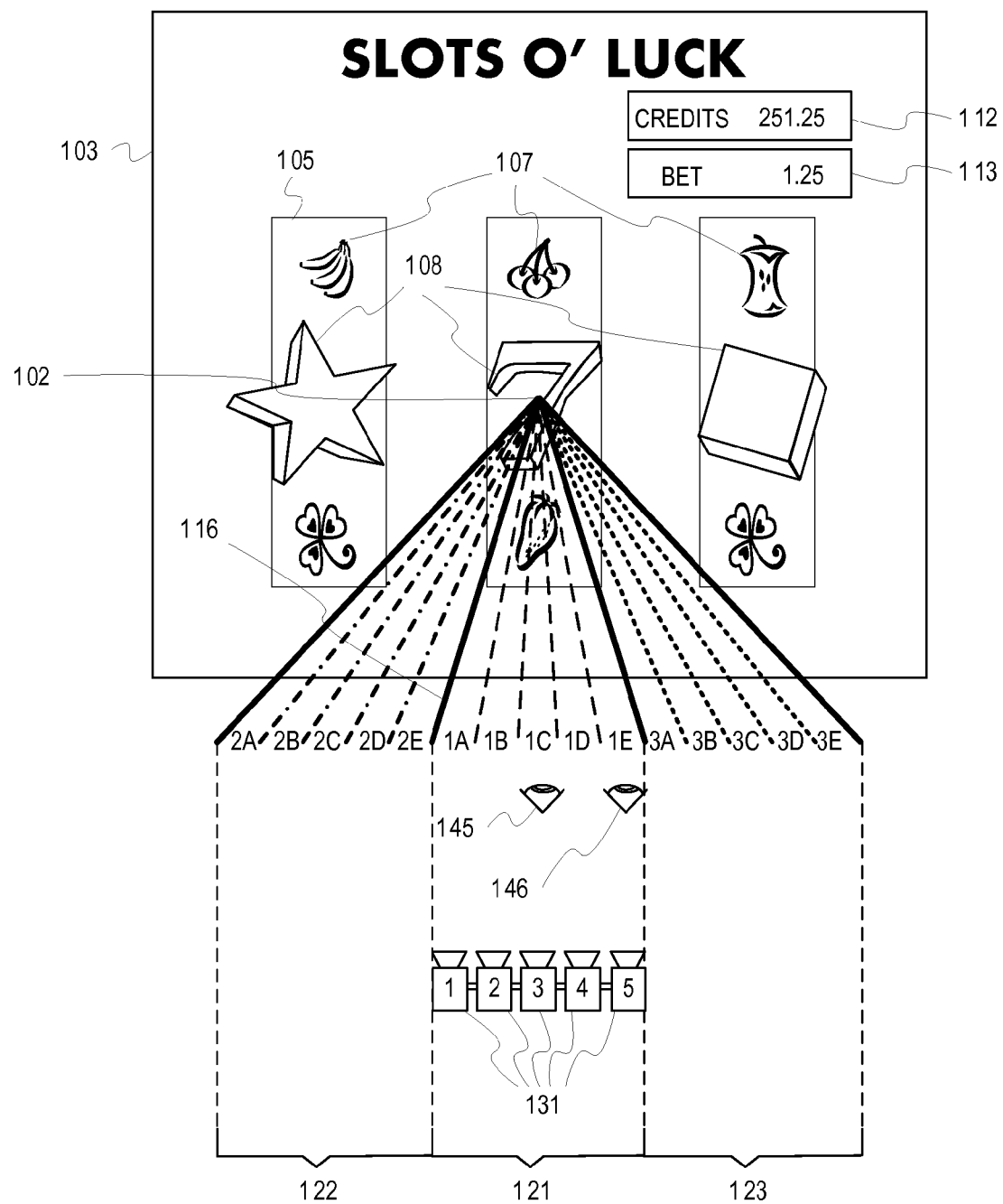
FIGS. 1 and 2 are an illustration of presenting autostereoscopic gaming content with view aliasing.
Figure 2:
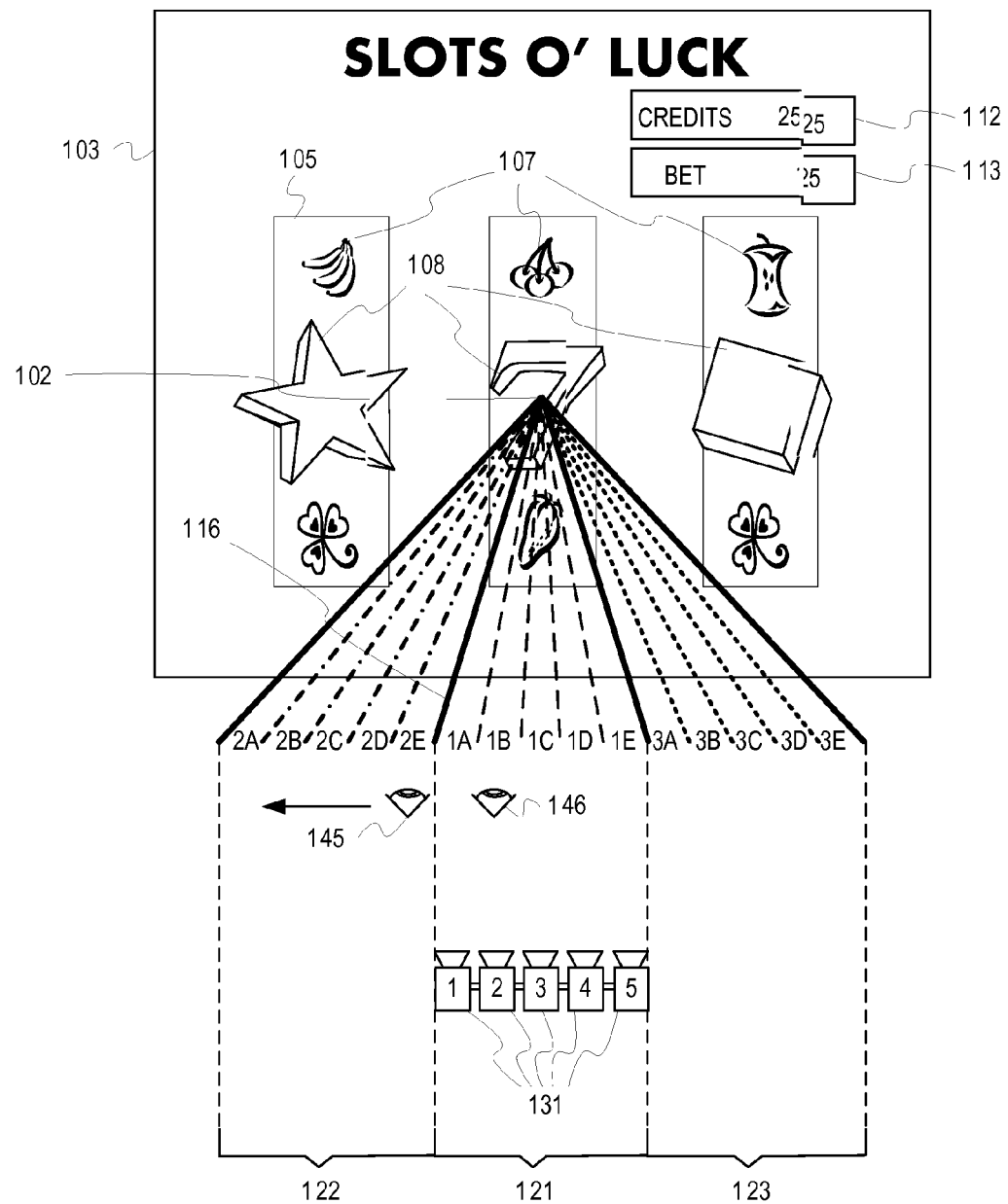

Referring first to FIGS. 1 and 2, autostereoscopic 3D displays utilize a combination of virtual 3D capturing and mechanical presentation techniques to generate the multiple 3D images. FIG. 1 illustrates an example of an autostereoscopic 3D display ("display") 103. The display 103 utilizes a number of sets of virtual cameras 131 to take multiple sets of virtual images that can be concurrently presented via the various views of the display 103 as autostereoscopic 3D content and/or 2D content. The display 103 presents some gaming content 3D (e.g., reel symbols 108) while, concurrently, the display 103 presents other reel symbols 107 in 2D. The display 103 can present a credit meter 112 and/or a bet meter 113 in 2D or 3D. For the examples of FIGS. 1-6, the display 103 presents the credit meter 112 and bet meter 113 in 3D. Any one of the autostereoscopic 3D views of the content is generated by one of a grouping of virtual cameras 131. Each of the virtual cameras 131 take a slightly offset image from the one to its left or right (i.e., the images that can correspond to a left eye 145 and a right eye 146 of a viewer). In one example, the display 103 is capable of concurrently displaying five instances of an image of 3D content. The set of cameras 131 has five different cameras that capture five sets of images of the 3D content from five different perspectives. The five sets of images are then displayed concurrently via the display 103 at various viewing angles. In FIG. 1, the display 103 includes an array of optical units. Each optical unit in the display 103 (e.g., optical unit 102) is associated with a pixel grouping that includes a number of pixels (e.g., one lenticular lens or one barrier slit over are over the pixels) that project a number of numerically consecutive images or "views" of wagering game content. The views are projected adjacently at consecutive angles so that they are separately viewable by one of the eyes (e.g., the left eye 145 or the right eye 146) of the viewer. The optical unit 102, for instance, projects fifteen different views of pixels associated with a location of the optical unit 102 across three different view zones 121, 122, and 123 (within the visible 180 degrees of the display). Each of the three different view zones 121, 122, and 123 project five views each (five views is a simplistic example; many standard autostereoscopic displays project many more than five views). Each of those five views is a different perspective of the pixels of wagering game content at five different viewing angles (e.g., the five different cameras in the camera set 131 take five separate images of the content at five different angles and the optical unit 102 concurrently projects those five separate images). The same five perspectives repeat in each of the view zones 121, 122, and 123. The view zone 121 may be referred to as a primary view zone or, rather, a view zone by which the display 103 is optimized for viewing by the viewer. However, once the edge of a primary view zone is passed, the views alias, or change the appearance of the content to a new overall perspective. For example, once the left eye 145 passes over the left edge 116 of the view zone 121, the visible content appears to repeat starting at the right-most perspective of the image. Thus, if a viewer gets too far off-center, one, or both, of their eyes will enter an aliased view zone, or rather, a view zone in which content appears substantially similar to the way it is visible in a primary viewing zone but which has some sort of distortion because of the change to the adjacent view zone. Furthermore, if one eye is in one view zone and another eye is in an adjacent view zone, a "cross-eyed" or inverted 3D image can occur.

More specifically, the five views in a view zone are separated into "view designations" where each view designation represents a different perspective of the content image. Zone 121, for instance, has five view designations 1A, 1B, 1C, 1D, and 1E. The designation of 1A is one perspective different from 1B, 1C, 1D and 1E. Zone 122 has five view designations 2A, 2B, 2C, 2D, and 2E and zone 123 has five view designations 3A, 3B, 3C, 3D, and 3E. The perspectives projected from the view designations 2A, 2B, 2C, 2D and 2E or 3A, 3B, 3C, 3D, and 3E are the same five perspectives respectively of view designations 1A, 1B, 1C, 1D, and 1E (e.g., view designation 1A is the same perspective as view designation 2A or 3A). A first view designation (e.g., for views 1A, 2A or 3A) is a designation of the left-most view of any given view zone. The first view designation abuts the left-most boundary of a view-zone. A second view designation (e.g., for views 1B, 2B, or 3B) is the designation of the view to the immediate right of the first view designation. A third view designation (e.g., for views 1C, 2C and 3C) is the designation of the view immediately to the right of the second view designation, and so forth for the fourth view designation (e.g., for views 1D, 2D and 3D) and the fifth view designation (e.g., for views 1E, 2E, and 3E). The view designations may also be referred to as "view perspectives" or "view images." Therefore, the optical unit 102 simultaneously projects or presents multiple view images and multiple view zones.

In FIG. 1, the optical unit 102 projects a first of the view images within the view zone 121 (i.e., the view associated with view designation 1C), which first view image falls on a first of the viewer's eyes (e.g., the viewer's left eye 145). Simultaneously, the optical unit 102 projects a second of the view images within the view zone 121 (i.e., the view associated with view designation 1E), which second view image falls on a second of the viewer's eyes (e.g., the second view image falls upon the viewer's right eye 146 while simultaneously the first view image falls upon the viewer's left eye 145). This produces an autostereoscopic 3D effect.

In FIG. 2, as the viewer moves to the left, the viewer's left eye 145 may cross over into zone 122, which is a view zone that repeats the perspectives of the view images within zone 121, while another of the viewer's eyes (e.g., the viewer's right eye 146) is still within zone 121. For instance, as the viewer moves leftward (in FIG. 2), the viewer's left eye 145 sees the perspective at the fifth view designation (2E) of zone 122 while the viewer's right eye still sees a view (i.e., view 1B) within zone 121. The fifth view designation (2E) in view zone 122 is for a view perspective that has wrapped around to appear as the far-right perspective of the content which is seen by the left eye 145, but the right eye 146 sees a perspective of the second view designation (1B) of view zone 121, which is more to the left, of the five view perspectives, than that of the perspective of the fifth view perspective (2E) in view zone 122. This causes the 3D content to appear wrapped around, and distorted. This distortion can be detrimental to wagering game activities for various reasons. For example, the distortion can cause viewers to experience headaches, nausea, vertigo, etc. The distortion can cause confusion in a player's mind, which may potentially cause the player to become dissatisfied with the gaming experience and stop playing the game. The credit meter 112 and bet meter 113, if presented in autostereoscopic 3D, may also appear distorted, which can lead a user astray regarding what their true credit total is or how much they are betting on a given play of the wagering game Some embodiments, however, (e.g., as described in FIGS. 3-6 and other embodiments described below) detect which view zone the viewer encounters, as well as which view the viewer encounters within that zone, when the viewer moves horizontally relative to the face of an autostereoscopic display. By detecting the view zone and view that the viewer has encountered, some embodiments correct a wrap-around distortion that occurs between the view zones as well as any other distortions that occur when the viewer moves further away from the center of the front of the display.

Figure 3:
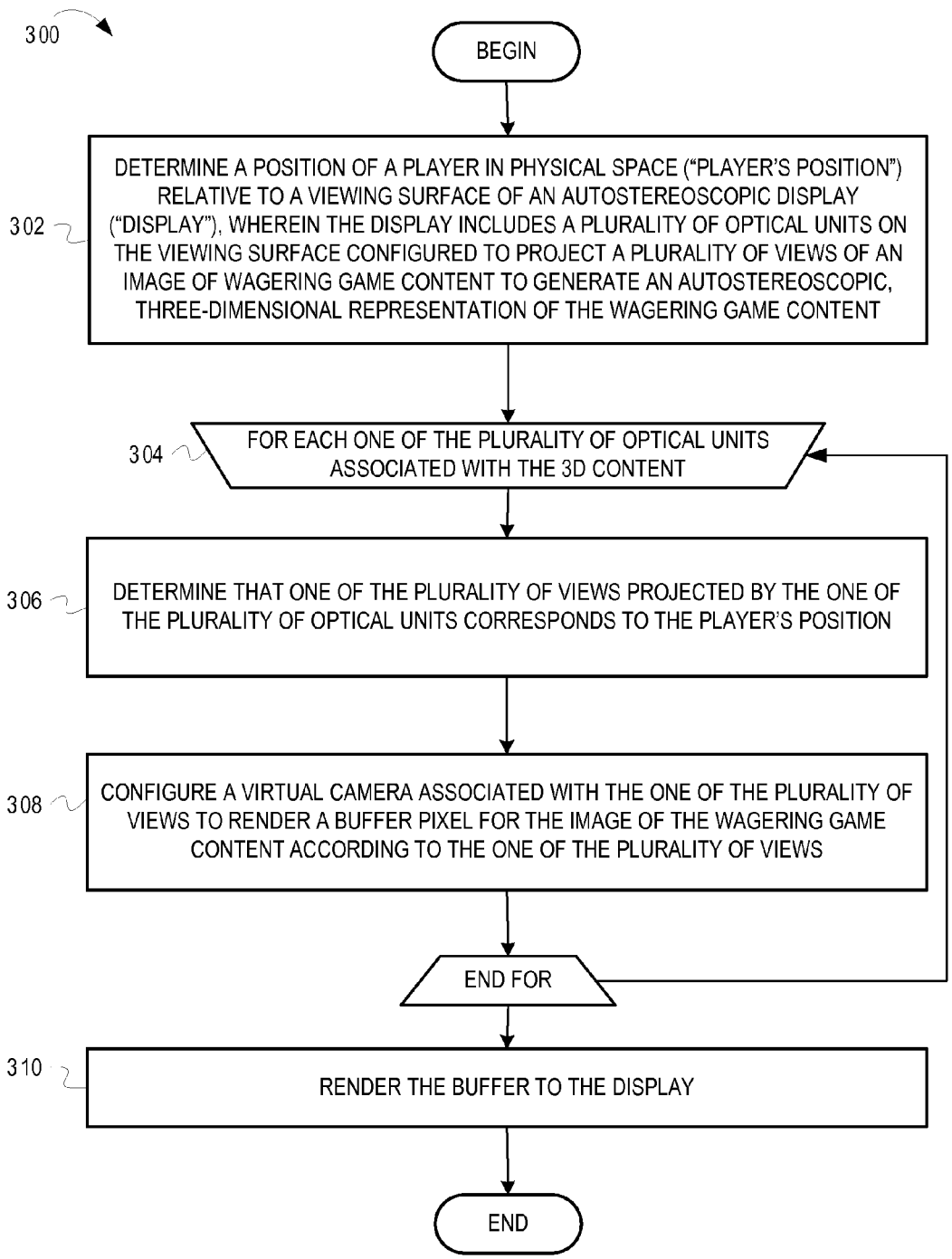
FIG. 3 is a flow diagram 300 illustrating presenting autostereoscopic gaming content according to viewer position, according to some embodiments.

FIG. 3 is a flow diagram ("flow") 300 illustrating presenting autostereoscopic gaming content according to viewer position, according to some embodiments. FIGS. 4, 5, and 6 are conceptual diagrams that help illustrate the flow of FIG. 3, according to some embodiments. This description will present FIG. 3 in concert with FIGS. 4, 5 and 6. In the discussion below, some flow diagrams are described with reference to block diagrams presented herein. However, in some embodiments, the operations can be performed by logic not described in the block diagrams. Further, in certain embodiments, the operations can be performed by executing instructions residing on tangible, machine-readable storage media (e.g., software stored on a disk), while in other embodiments, the operations can be performed by hardware and/or other logic (e.g., firmware). In some embodiments, the operations can be performed in series, while in other embodiments, one or more of the operations can be performed in parallel. Moreover, some embodiments can perform more or less than all the operations shown in any flow diagram.

In FIG. 3, the flow 300 begins at processing block 302, where a wagering game system ("system") determines a position of a player in physical, or real-world, space ("player's position") relative to a viewing surface of an autostereoscopic display ("display"), wherein the display includes a plurality of optical units on the viewing surface configured to project a plurality of views of an image of wagering game content to generate an autostereoscopic, three-dimensional representation of the wagering game content.

The flow 300 continues at processing block 304, where the system processes a repeating subroutine using an iteration statement such as a "for" loop. Examples of iteration statements herein may specifically refer to a for loop, however it should be understood that other iterative statements (e.g., "while" loops or other loop statements) may be used. In the for loop of processing block 304, the loop repeats for each one of the plurality of optical units associated with the 3D content. (i.e., for each rendition of the image of 3D content projected by each of the plurality of optical units).

The flow 300 continues at processing block 306, where the system determines that one of the plurality of views projected by the one of the plurality of optical units, corresponds to the player's position. In some embodiments, the system determines that the one of the plurality of views is from one of a plurality of view designations and the system repeats the subroutine of processing block 304 for all views of the one of the plurality of view designations (starting with the one of the plurality of views) prior to moving to a second view designation. Further, the system selects the one of the plurality of views.

The flow 300 continues at processing block 308, where the system configures a virtual camera associated with the one of the plurality of views to render a buffer pixel for the image of the wagering game content according to the one of the plurality of views. In some embodiments the system positions a plurality of virtual cameras in three-dimensional virtual space (also referred to as "3D space," "virtual world space," or "virtual space") based on the player's position, wherein each of the virtual cameras captures at least a portion of the wagering game content that would be seen at an angle between the virtual camera and the one of the plurality of optical units. For example, in some embodiments, as in FIG. 4, the system positions a group of virtual cameras 450 in virtual space to a virtual position that corresponds to a player's physical position. The system includes an autostereoscopic display ("display") 403. The system draws images of 3D content using the group of virtual cameras 450. The system tracks the position of the player. In some embodiments, the group of virtual cameras 450 is a camera rig with a number of virtual cameras ("N") that corresponds to a number of views within a view zone. Each virtual camera in the camera rig is spaced uniformly according to a width of a view at a distance that corresponds to the player's position. The system determines viewing angles for each of the cameras in the rig as they align with an optical unit on the display 403. The system then configures each of the virtual cameras on the rig to render content for display at pixels at the location of the optical unit 402 according to the viewing angles. In other words, the system sets parameters for the virtual camera, such as measurements and shapes of volume of virtual space that the virtual camera should capture for rendering. The system also sets parameters (e.g., measurements and shapes) of the plane onto which the content of the volume of virtual space will be flattened to form an image (during rendering). The image is then projected by the optical unit 402 at the various viewing angles. In other embodiments, the system generates, or constructs, the group of virtual cameras 450 according to a repeating subroutine that determines and selects views of a view designation that are closest to the player's position (with a number of virtual cameras "N" more than the number of views within a view zone and wherein the virtual cameras are not spaced uniformly). In the embodiments where the system constructs the group of virtual cameras 450, the system determines viewing angles for each of the constructed cameras as they align with an optical unit 402 on the display 403. The system then configures each of the constructed virtual cameras (e.g., sets parameters) to display content at pixels at the location of the optical unit 402 according to the viewing angles. The system then renders an image to pixels at the location of the optical unit at the viewing angles. When the player's position moves, as in FIG. 5, the system either moves the group of virtual cameras 450 (in the case of a fixed-spaced camera rig) or regenerates the group of virtual cameras 450. By moving or regenerating the group of virtual cameras 450, the system redraws the 3D content based on the new positions of the virtual cameras as the player moves (i.e., the system reconfigures virtual cameras according to new viewing angles according to the player's new position and re-renders the content according to the parameters of the new configurations). Viewing angles of the views in a viewing zone shift positions with the movement of the player, as in FIG. 6. The viewing angles of the perspectives associated with the view zones are based on the player's new position. As a result, the view zones are adapted to the player's position and, therefore, the system prevents distortions and/or a wrap-around effects that occur when the player moves left to right and/or when the player transitions between viewing zones. In effect, the system optimizes the view to the player's position.

In some embodiments, the system configures a virtual camera by setting a frustum of the virtual camera to at least a portion of the wagering game content associated with the one of the plurality of optical units. For example in the embodiment where the system positions the camera rig, the system configures a frustum for each of the plurality of cameras in the camera rig to regions of the display to be rendered by each of the cameras in the camera rig (see, for example, processing block 708 of flow 700 illustrated in FIG. 7). In other embodiments, where the system constructs virtual cameras based on a closeness to the player's position, the system sets a frustum of each of the constructed cameras to a horizontal length of an optical unit that projects the view (see, for example, processing block 1614 of flow 1600 illustrated in FIG. 16).

The flow 300 continues at processing block 310, where the system renders the buffer to the display. As described above at processing block 308, the system sets parameters for the virtual camera, such as measurements and shapes of volume of virtual space that the virtual camera should capture for rendering. The system also sets parameters (e.g., measurements and shapes) of the plane onto which the content of the volume of virtual space will be flattened to form an image (during rendering). In other words, as described above, the system utilizes the parameters of the configured virtual camera as part of the rendering. For example, "orthographic" parameters are used to render certain geometric dimensions of an object in virtual space (e.g., orthographic parameters are used to capture an image of a box with all parallel sides). "Perspective" parameters are used to render certain geometric dimensions of an object as it would appear from the perspective of the camera (e.g., perspective parameters are used to capture a region of virtual space that contains the box, which region tapers smaller towards the virtual camera and wider away from it). In some embodiments, the system further combines both orthographic and perspective parameters for a grouped virtual camera that groups together a set of constructed virtual cameras (e.g., to render the image of the box with parallel sides in one direction, or "axis," of virtual space and tapering sides in another direction in virtual space).

Although the figures previously discussed describe some embodiments, the following sections describe many other features and embodiments. For example, many of the elements described in FIGS. 3 through 6 will be described in further detail for embodiments described in FIGS. 7 through 21.

Example Operations

This section describes operations associated with some embodiments. In the discussion below, some flow diagrams are described with reference to block diagrams presented herein. However, in some embodiments, the operations can be performed by logic not described in the block diagrams.

In certain embodiments, the operations can be performed by executing instructions residing on machine-readable storage media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform more or less than all the operations shown in any flow diagram.

Furthermore, some embodiments of the inventive subject matter describe examples of presenting autostereoscopic gaming content according to viewer position in a network wagering venue (e.g., an online casino, a wagering game website, a wagering network, etc.) using a communication network, such as the communications network 122 in FIG. 1. Embodiments can be presented over any type of communications network that provides access to wagering games, such as a public network (e.g., a public wide-area-network, such as the Internet), a private network (e.g., a private local-area-network gaming network), a file sharing network, a social network, etc., or any combination of networks. Multiple users can be connected to the networks via computing devices. The multiple users can have accounts that subscribe to specific services, such as account-based wagering systems (e.g., account-based wagering game websites, account-based casino networks, etc.).

Further, in some embodiments herein a user may be referred to as a player (i.e., of wagering games), and a player may be referred to interchangeably as a player account. Account-based wagering systems utilize player accounts when transacting and performing activities, at the computer level, that are initiated by players. Therefore, a "player account" represents the player at a computerized level. The player account can perform actions via computerized instructions. For example, in some embodiments, a player account may be referred to as performing an action, controlling an item, communicating information, etc. Although a player, or person, may be activating a game control or device to perform the action, control the item, communicate the information, etc., the player account, at the computer level, can be associated with the player, and therefore any actions associated with the player can also be associated with the player account. Therefore, for brevity, to avoid having to describe the interconnection between player and player account in every instance, a "player account" may be referred to herein in either context. Further, in some embodiments herein, the word "gaming" is used interchangeably with "gambling."

FIG. 7 is a flow diagram ("flow") 700 illustrating presenting autostereoscopic gaming content according to viewer position, according to some embodiments. FIGS. 8A, 8B, 8C, 9A, 9B, 10A, 10B, 11A, 11B, 12A, 12B, 13A, 13B, 14A, 14B, 15A, 15B, and 15C (collectively FIGS. 8A through 15C) are conceptual diagrams that help illustrate the flow of FIG. 7, according to some embodiments. This description will present FIG. 7 in concert with FIGS. 8A through 15C. In FIG. 7, the flow 700 begins at processing block 702, where a wagering game system ("system") determines a player's position in physical space relative to a viewing surface of an autostereoscopic 3D display ("display") and determines a physical distance of the player from the display given the player's position. For example, in FIG. 8A, the system detects (e.g., via a camera associated with the display 803, a sensor or location detector associated with the player, etc.), a location 801 of a player in front of the display 803 (e.g., a location coordinate that includes at least a distance from the display 803 and a position relative to corners and/or other parts of a viewing surface of the display 803). In some embodiments, the system detects that the player at the location 801 is associated with a wagering game being played via the display 803. For instance, the player may be one of multiple individuals around or in front of the display 803. To ensure that the player is the individual for whom the image of the display 803 is to be optimized, the system can detect the identity of the player via biometrics (e.g., facial recognition), a unique signal (e.g., a signal transmitted via global positioning service (GPS) device assigned to the user, a signal transmitted from a radio-frequency identification (RFID) device, etc.), or any other way to detect a person's identity. Once the system determines the identity of the person, the system can compare the identity of the player to information associated with a player account that is logged in to a wagering game machine associated with the display 803 (e.g., compare an RFID number to an owner chart, then compare an owner's name to the name on the player account, compare a facial map scanned of the player to a facial map on record for the player account, etc.). Upon finding a match between the player and the player account associated with the wagering game content presented via the display 803, the system uses the location 801.

Using the location 801, the system determines a physical distance 804 from the display 803. For instance, the system can utilize a stereo camera (dual camera) tracking system to detect differences between images of the viewer, and in some cases optical cues (e.g., sizes, shapes, distances, viewpoints, shadowing, lighting angles, etc.) of the environment. In some examples, the system can detect a viewer's head size and facial feature sizes, position, etc. (e.g., eye spacing) which scales with the distance 804 from the display 803. In some examples the system can estimate the distance 804 based on an estimate of how far the location 801 is from the display 804 (e.g., based on an estimate of a position of a line 808 that is both parallel to the top or bottom edge of the display 803 and which passes through the viewer position 801, the system then estimates the distance 804 from the top or bottom edge of the display to the line 808). In some embodiments, the system detects the distance 804 from signals generated by a GPS device, or other location sensor associated with the player.

Returning momentarily to the description of FIG. 7, the flow 700 continues at processing block 704, where the system computes a view spacing for the views of any given view zone based on the player's distance. In FIG. 8B, the display 803 includes a plurality of optical units on the viewing surface configured to project a plurality of views of an image of wagering game content to generate an autostereoscopic, three-dimensional representation of the wagering game content. For example, the optical unit 802 includes a lenticular lens 802D, from an array of lenticular lenses, which lenticular lens 802D is positioned over a first set of pixels 802A. The lenticular lens 802D projects a first set of five views (from the five pixels in the first set of pixels 802A) for a first view zone 821. Furthermore, the lenticular lens 802D also projects a second and third set of five views for two adjacent view zones 822 and 823. The first view zone 821 may be referred to as a primary view zone and view zones 822 and 823 may be referred to as "alias" view zones of the first view zone 821, or in other words, view zones within which the image of the gaming content changes to a different perspective as seen from the lenticular lens 802D if the player were to move left or right from the given location 801 to cross over view boundaries. In other words, within each group of five pixels, corresponding positions come from the same image/camera angle. For example, a left-most pixel of each group all share one specific angle, and a the right-most pixel in each group all share one specific angle, etc. Hence, when a viewer crosses the view zone boundary, the image the viewer sees resets from the further angle in one direction to the further angle in the other direction.

The system determines a width of a view zone (e.g., the width of view zone 821) at the physical distance 804 and subdivides the width linearly into a width ("view width") 810 of a view within the view zone. The view width 810 is used as a substantial equivalent to any other view width for the display 803 at the distance 804. Some autostereoscopic displays have view zones with uniform widths. If the autostereoscopic display has view zones with uniform widths, then each of the view zones can be segmented into a same fixed number of virtual cameras, as in the example of FIG. 7. Some autostereoscopic displays do not have view zones with uniform widths. The process associated with flow 700 can still be used for such non-uniform displays, however, other embodiments, such as the process of flow 1600, described in FIG. 16, may yield more accurate results with such non-uniform displays.

Returning momentarily to the description of FIG. 7, the flow 700 continues at processing block 706, where the system sets a virtual position of a virtual camera rig in three-dimensional virtual space (also referred to as "3D space," "virtual world space" or "virtual space") to correspond to the viewer's position in physical space, wherein the camera rig includes a plurality of virtual cameras, and set a camera spacing of the plurality of virtual cameras in the rig to match the view spacing of each view. In some embodiments, as shown in FIG. 8C, the system positions an n-virtual-camera rig ("camera rig") 850 centered, in virtual space, to correspond with the location 801 of the viewer's position. The number of cameras in the camera rig 850 are equivalent to the number of views within a view zone (e.g., in the examples of FIGS. 8A-15C, the camera rig 850 has five virtual cameras 801, 802, 803, 804, and 805 referred to collectively as "virtual cameras 801-805"). The position of the camera rig 850 remains stationary in virtual space for as long as the player's position remains in the same.

Furthermore, as shown in FIG. 8C, the system spaces each of the virtual cameras 801-805 a virtual distance from each other, which virtual distance corresponds in virtual width within the virtual space to the view width 810.

Figure 9A:
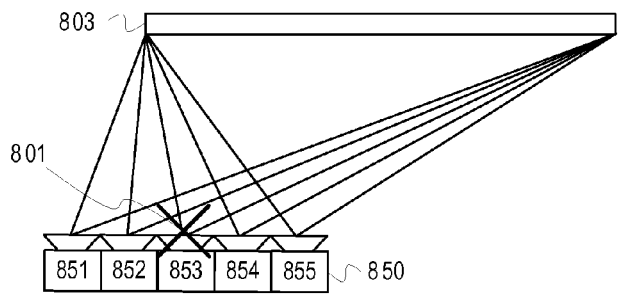
Figure 9B:
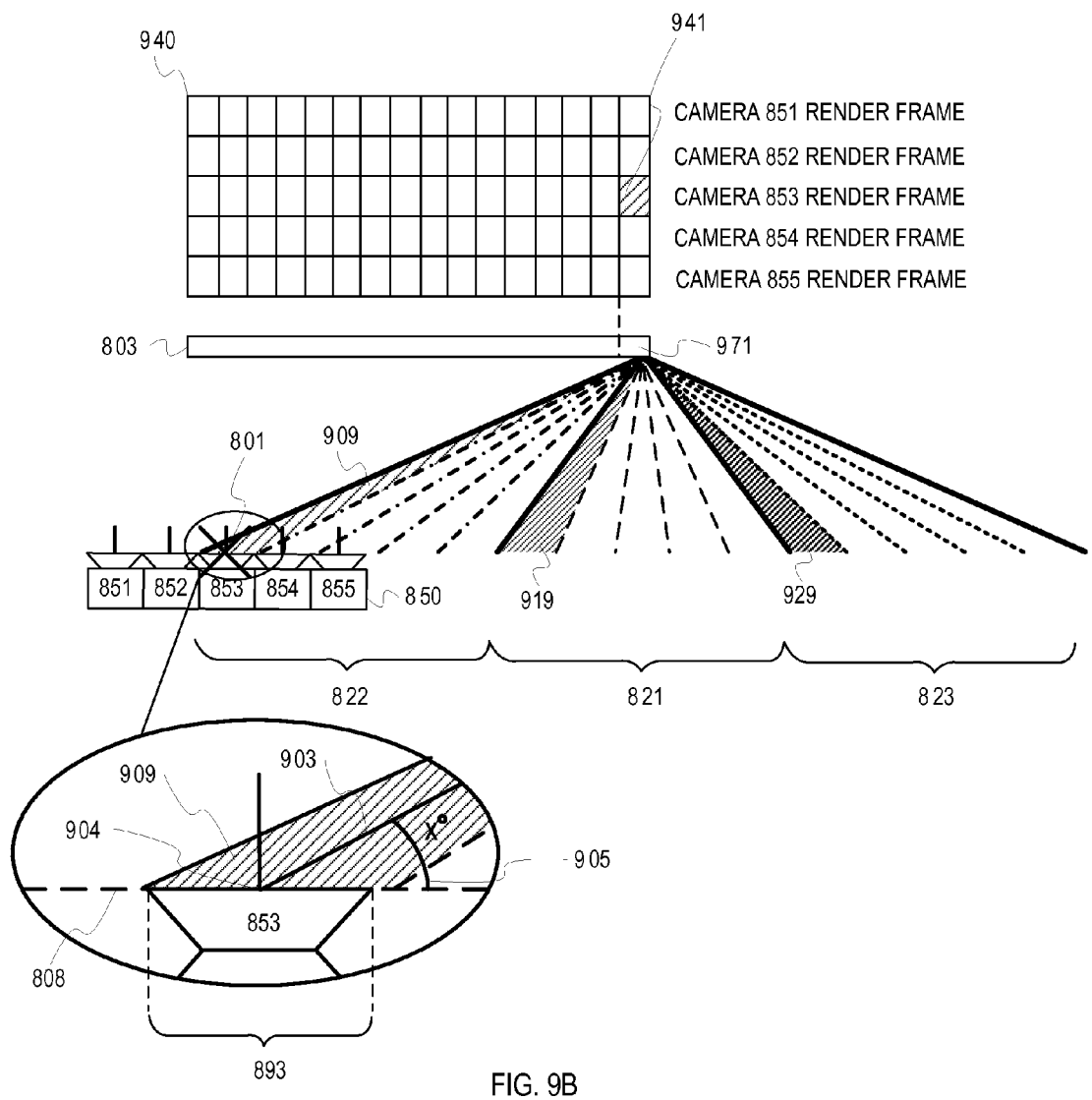

Returning momentarily to the description of FIG. 7, the flow 700 continues at processing block 708, where the system sets a camera view frustum for each of the plurality of cameras to align with the bounds of the display. As shown in FIG. 9A, the system sets an off-camera-axis view frustum, for each of the virtual cameras 851-855, to align with the boundaries of the display 803 (e.g., to align with the corners of the display 803 based on the position, both vertically and horizontally, of the eyes of the player relative to the corners of the display 803). Typically when configuring a virtual camera for 3D rendering, the axis along which the 3D scene in virtual space is projected onto the image capture plane ("image plane") is the line down the center of the frustum. The image plane is typically perpendicular to that line. However, according to some embodiments, the system maintains the image capture plane parallel to the viewing surface of the display 803 regardless of the edges of the frustum and regardless of the axis of projection. Therefore, the phrase "off-axis" refers to the projection axis being off the perpendicular of the image plane. Typical rendering pipelines are set up to project 3D content onto a 2D plane perpendicular to the line between the center of the image plane and the camera, and where, resultantly, the camera is always considered to be straight on to the center of the display. For some embodiments, however, the system maintains the image plane parallel to the display 803 even when the camera that captures the image is not positioned along the line normal to the center of the image plane. Otherwise, a required compensatory distortion the brain expects will not occur, and the image will perceptually appear distorted. The system uses an "off-axis perspective" camera projection matrix which defines a view frustum converging at the viewer's location, passing through the four corners of the display 803 (or a segment thereof), and preserving the render image plane parallel with the physical display 803.

Returning momentarily to the description of FIG. 7, the system processes a nested repeating subroutine (e.g., a "for" loop with three nested loops) as illustrated at processing blocks 710, 712, and 714. The operations associated with the nested repeating subroutine will first be presented as they appear in FIG. 7, then a specific example of the repeating subroutine will be discussed. The flow 700 continues at processing block 710, where in a first of the nested for loops, of processing block 710, the loop repeats for each view designation ("current view designation") associated with the views projected by an optical unit. The flow 700 continues at processing block 712, where the system processes a second of the nested loops, at processing block 712. In the second nested for loop, the loop repeats for each view ("current view") that aligns to one of the virtual cameras, from the current view designation starting with a far-most view of a view zone. The flow 700 continues at processing block 714, where the system processes a third of the nested loops, at processing block 714. In the third nested for loop, the loop repeats for each of the plurality of optical units associated with the 3D content presented via the display the system ("current optical unit")

A specific example of the subroutine of processing blocks 710, 712 and 714 will now be discussed. Regarding processing block 714, in some embodiments, the system selects the current optical unit starting at a first given optical unit at a first given location on the display that corresponds to a far edge of an image of the gaming content. For example, in FIG. 9B, the system starts with an optical unit associated with location 971 associated with a pixel grouping at a far-right edge of a portion of the display 803 that will present 3D content. For simplicity of description, the location 971 also coincides with the far-right edge of the display 803 (such as for presentation of 3D gaming content that spans an entire length of the display 803). Other embodiments, however, do not necessarily have to span an entire autostereoscopic 3D display, especially given that both 2D and 3D content are presentable via the autostereoscopic 3D display in various embodiments. Consequently, some, or all, of the elements of FIG. 7 can be repeated for different portions of the display 803 (e.g., for groupings of optical units of 3D content that are separated by areas of 2D content presented concurrently on the autostereoscopic 3D display). Portions of the wagering game content that will not be presented in 3D duplicate the same 2D content for an entire column of a view because only one view of the 2D content will be projected across contiguous columns of views.

Regarding processing block 712, referring back to FIG. 9B, the system observes which of the views, perceptible from a projection of an optical unit at the first given location 971, would align to (e.g., intersect) a camera of the camera rig 850 at its current location. For instance, in some embodiments the system determines the furthest or extreme (e.g., left-most) view (i.e., view 909), from the view zone 822 of the optical unit at location 971, aligns to a camera on the camera rig 850. In another embodiment, the system selects a view that is closest to the position of the viewer from the view zone 822. The view 909 is depicted as a diagonal-lined view. The diagonal-lined views represent a first view designation of the view zones projected by the optical unit at location 971. A detailed explanation of a transition to the next of the diagonal-lined views (i.e., to a next iteration of the loop of processing block 712) is presented further below in connection with the description of FIG. 14B.

Regarding processing block 710, in some embodiments, the system selects the current view designation (i.e., the diagonal lined view designation) by determining which view designation is associated with the far-most view (e.g., view 909 of view zone 822), that aligns to the camera rig 850. Upon a next repetition of 710, the system can select another view designation adjacent to the previously processed view designation (e.g., as in FIG. 15B, the system selects the horizontal-lined view designation next, after the diagonal-lined view designation has been processed, because the horizontal-lined view designation has a view 1509 that is next far-most to the left after the view designation of view 909). A more detailed explanation of the transition to the next iteration of the loop of processing block 710 is presented further below in connection with the description of FIG. 15B.

Returning momentarily to the description of FIG. 7, the flow 700 continues at processing block 716, where the system selects the virtual camera ("selected camera") from the camera rig that aligns to the current view. For example, in FIG. 9B, the system determines that the view 909 is closest to the middle (or falls primarily within the area of the virtual aperture) of camera 853, as opposed to angles for view instance 919 or 929, which represent other angles ("aliases") from which pixels at location 971 are visible for the same designation within the view zones. The system, therefore, selects camera 853. More specifically, in FIG. 9B, the system determines an angle 905 between a line 903 and the line 808. The line 903 intersects a location within an aperture 893 of the virtual camera 853 (e.g., a center position 904 of the virtual aperture of the camera 853) and a point at the optical unit (e.g., a center point of the lenticular lens 802D of FIG. 8B). The line 903 also intersects the line 808. The line 905 may be referred to as a viewing angle for the view 909 as aligned with the camera 853. An image that is virtually captured from the perspective of the camera 853, according to the angle 905, is based on a position and viewing angle for the camera 853 in virtual space, which position and viewing angle in virtual space corresponds to the position 801 and viewing angle at which a viewer would perceive the image in physical space).

Returning momentarily to the description of FIG. 7, the flow 700 continues at processing block 718, where the system configures the selected camera to render a frame of a pixel column for the wagering game content based on an angle of the current view. For example, in FIG. 9B, the system writes a buffer pixel 941 within a memory buffer 940, which buffer pixel 941 includes color values that correspond to a pixel at the location 971 that would be seen from a direct angle between the center of the selected camera 823 and the optical unit at the location 971.

Each of the buffer pixels are stacked vertically into a pixel column within the buffer 940 and have a one-to-one correspondence to specific pixels of the display 803 (although the pixels on the display do not necessarily have to be stacked vertically). Each column of the buffer 940 maps to a specific view presented by the display 803. During subsequent iterations of the repeating subroutine, if the current view aligns with same camera 823, then the system can configure the camera 823 to generate a graphical pixel image for that same view on the adjacent column of the buffer 940.

In some embodiments, the system repeats the operations of processing blocks 716, and 718 for the nested repeat of processing block 714 across the display 803, for additional optical units associated with the 3D content (e.g., repeats processing block 714), for the current view (e.g., for view 909 until view 909 leaves the camera rig 950, as shown in FIGS. 10A-11B). Specifically, in FIG. 10A, the system repeats processing block 714 for a second optical unit at a second location 1072 of the display 803. The second location 1072 is adjacent to the first location 971. The system detects that the view 909 aligns to the camera 852. Therefore, the system selects camera 852 and configures the camera 852 to generate a second buffer pixel 1042 in the render frame for camera 852 for the column of pixels associated with location 1072 of the display 803.

Figure 10A:
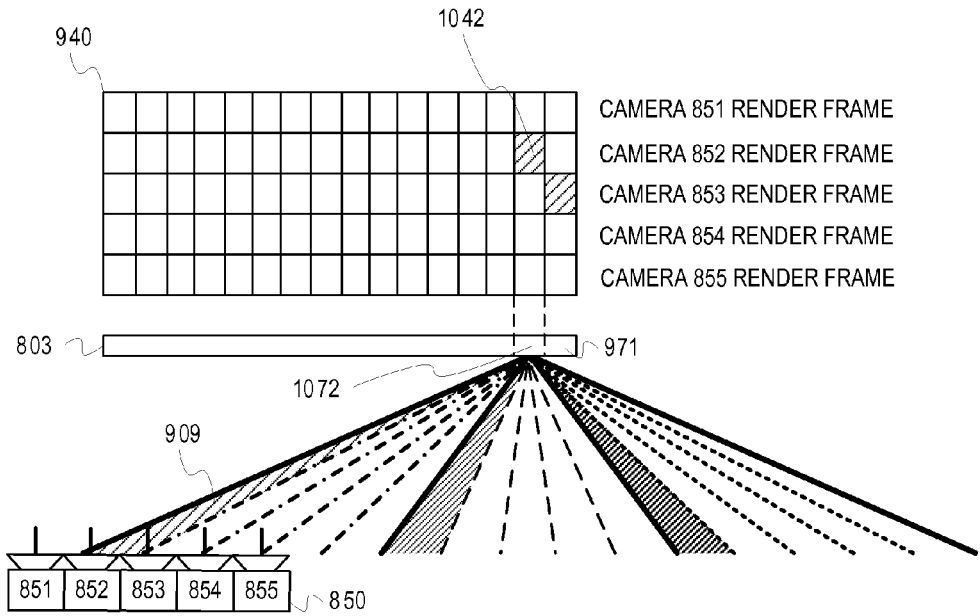
Figure 10B:
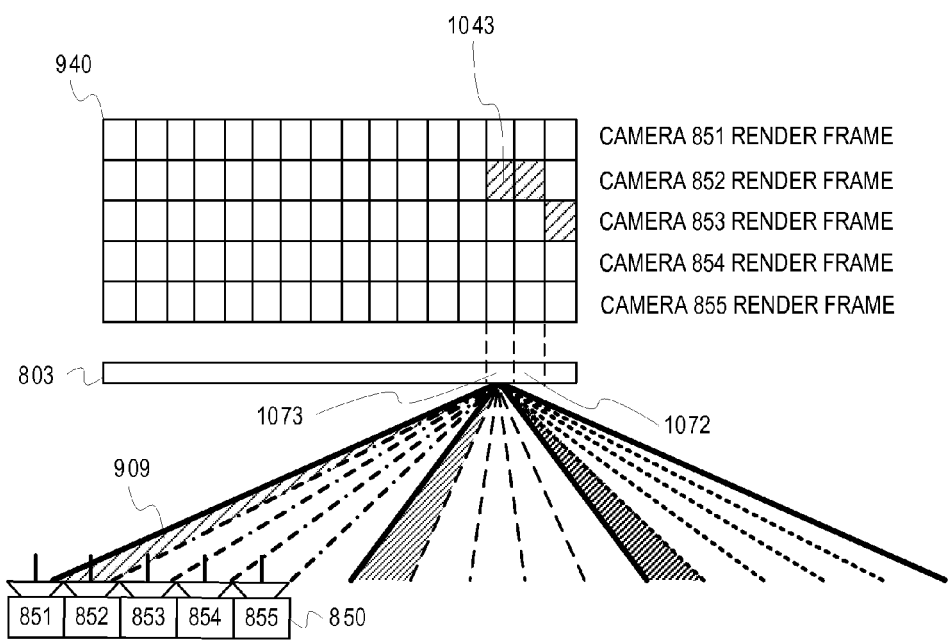

In FIG. 10B, the system repeats processing block 714 for a third optical unit at a third location 1073 of the display 803. The third location 1073 is adjacent to the second location 1072. The system detects that the view 909 aligns to the camera 852 again. Therefore, the system selects camera 852 and configures the camera 852 to generate a third buffer pixel 1043 in the render frame for camera 852.

Figure 11A:
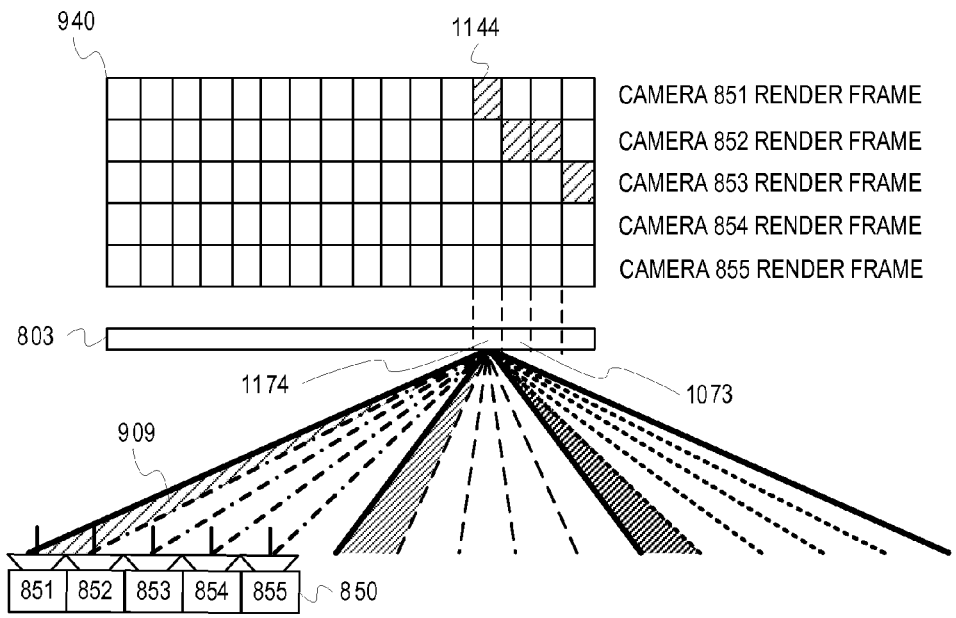

In FIG. 11A, the system repeats processing block 714 for a fourth optical unit at a fourth location 1174 of the display 803. The fourth location 1174 is adjacent to the third location 1073. The system detects that the view 909 aligns to the camera 851. Therefore, the system selects camera 851 and configures the camera 851 to generate a fourth buffer pixel 1144 in the render frame for camera 851.

Figure 11B:
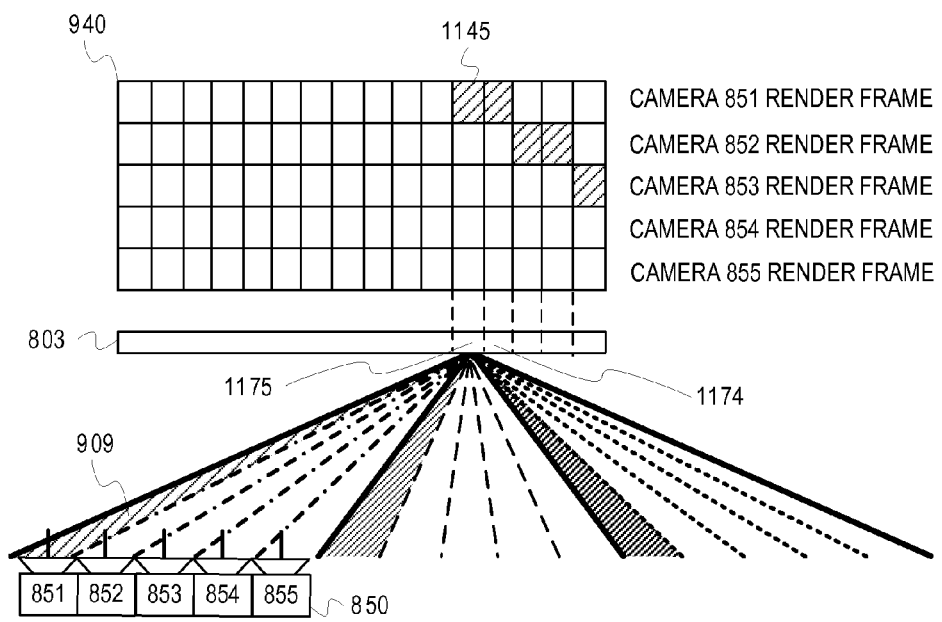

In FIG. 11B, the system repeats processing block 714 for a fifth optical unit at a fifth location 1175 of the display 803. The fifth location 1175 is adjacent to the fourth location 1174. The system detects that the view 909 aligns to the camera 851 again. Therefore, the system selects camera 851 and configures the camera 851 to generate a fifth buffer pixel 1145 in the render frame for camera 851.

Figure 12A:
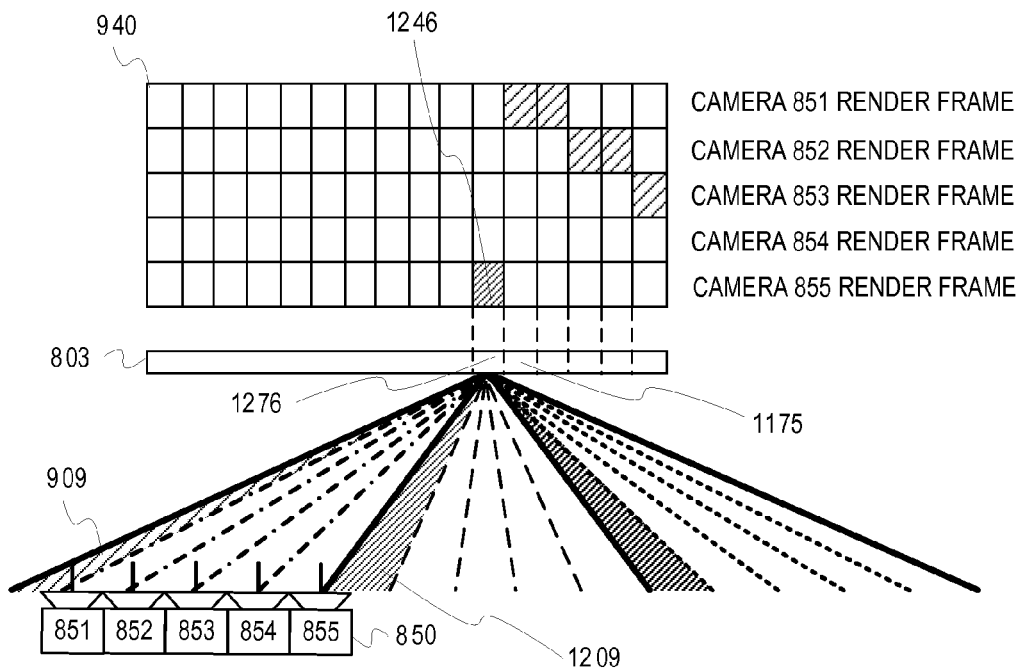

In FIG. 12A, the system repeats processing block 714 for a sixth optical unit at a sixth location 1276 of the display 803. The sixth location 1276 is adjacent to the fifth location 1175. The system detects that the view 909 no aligns to a slim portion of camera 851 again. However, the system detects that a view 1209, of the diagonal-lined designation, also aligns with a portion of camera 855. However, the system can only write one buffer pixel 1246 to the buffer 940 for the given location 1276. Therefore, the system detects which of the views 909 or 1209 is closer to the center of the respective cameras 851 or 855. In the case of FIG. 12A, the system determines that view 1209 is closer to the center of camera 855 than view 909 is to the center of camera 851, or in other words, view 1209 aligns more closely to camera 855 than view 909 does to camera 851. The system, therefore, increases the iteration of processing block 712 to the view 1209 and, without increasing the iteration of processing block 714, the system, at processing block 716, selects camera 855 and configures the camera 855 to generate the buffer pixel 1246 in the render frame for camera 855. It should be noted that when the for loop of 712 increments, it does not increment the for loop at processing block 714. In some embodiments, therefore, the for loop of processing block 712 may include, or instead be, an incrementing variable that increments in value within the for loop of processing block 714 when the system determines that a different view aligns with a camera of the camera rig 850.

Figure 12B:
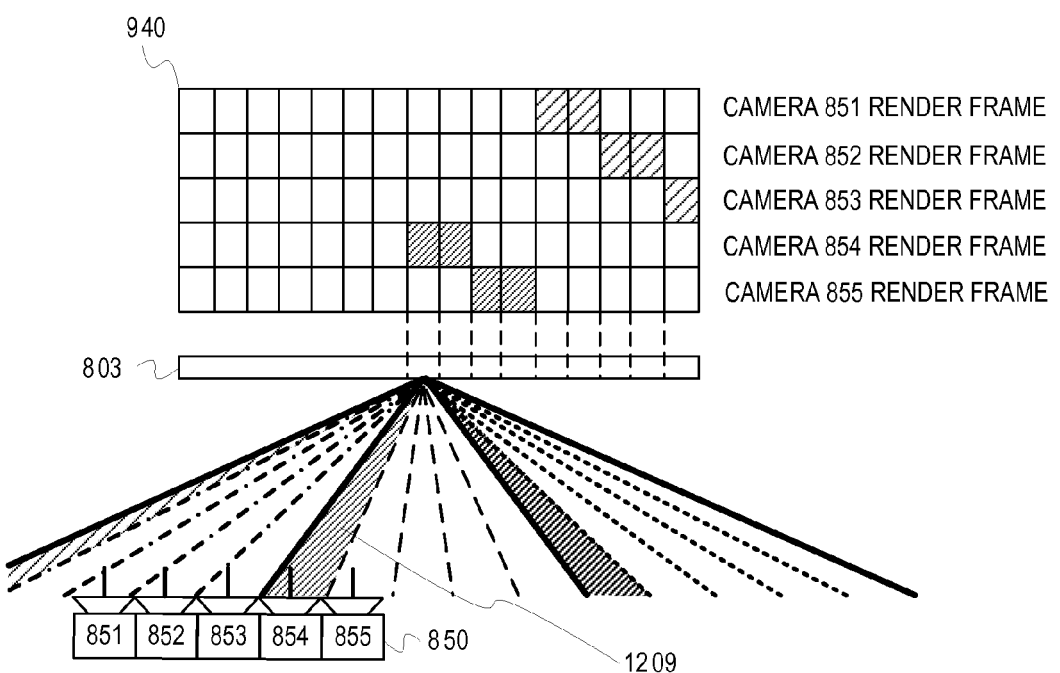
Figure 13A:
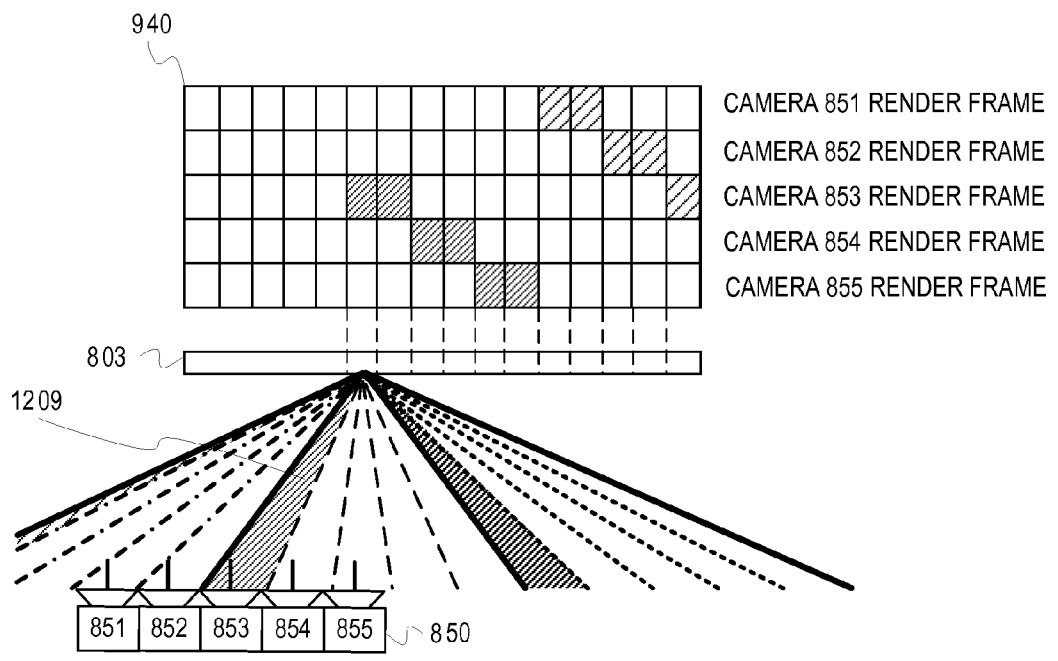
Figure 13B:
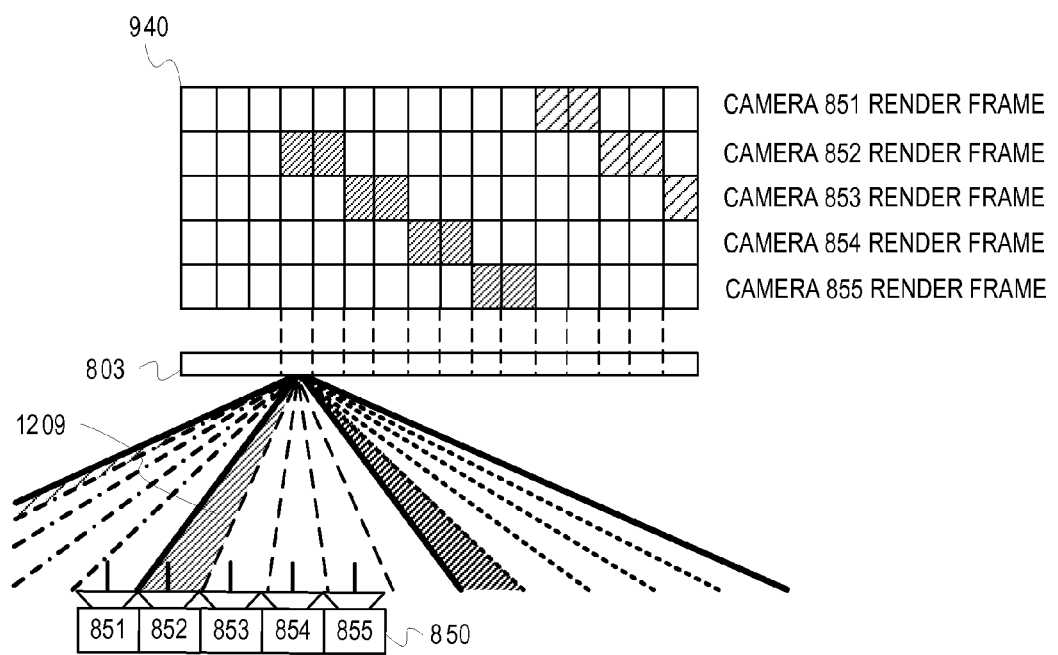
Figure 14A:
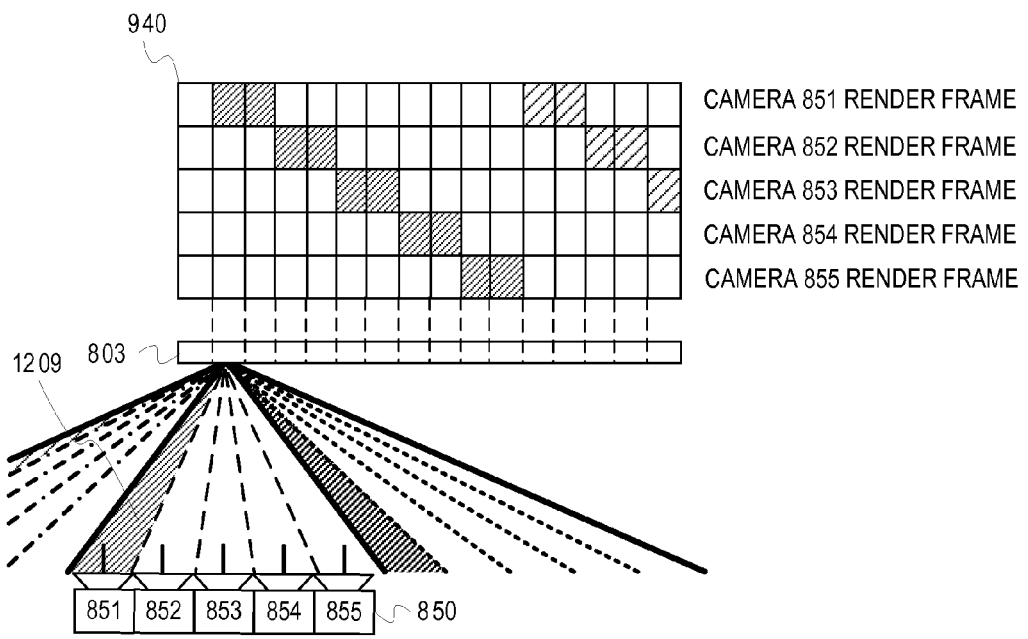

In FIG. 12B, the system continues to repeat the processing block 714 for the view 1209, selecting a virtual camera on the camera rig 850 that aligns to the view 1209, and writing a buffer pixel in the buffer 940 for each successive iteration of the for loop of processing block 714. FIG. 12B shows a state of the repeating subroutine after three more iterations after the iteration of FIG. 12A. FIG. 13A shows a state of the repeating subroutine after two more iterations after the iteration of FIG. 12B. FIG. 13B shows a state of the repeating subroutine after two more iterations after the iteration of FIG. 13A. FIG. 14A shows a state of the repeating subroutine after two more iterations after the iteration of FIG. 13B.

Figure 14B:
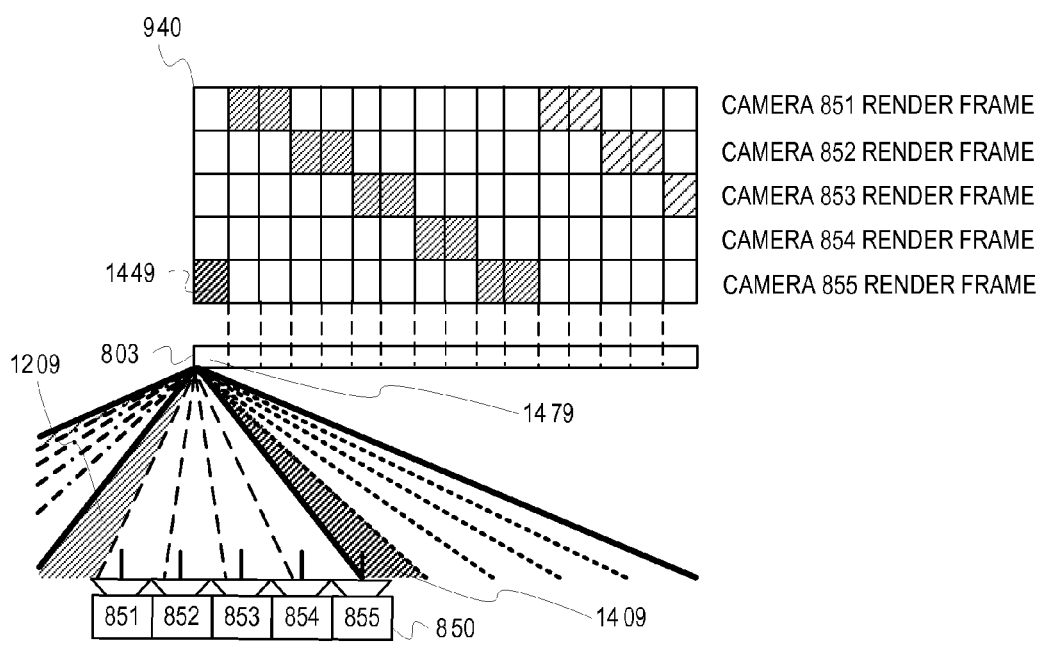

FIG. 14B shows a state of the repeating subroutine after one more iteration after the iteration of FIG. 14A. The system detects that the view 1209 no longer aligns with a virtual camera of the camera rig 850 but the view 1409 does (i.e., view 1409 aligns with the camera 855). Therefore, the system increments the for loop of processing block 712 and performs the operations of processing blocks 716 and 718, which generates a buffer pixel 1449 for a an optical unit at the location 1479 at the left edge of the display 803 (or at the left-edge of 3D content presented via the display 803).

Figure 15A:
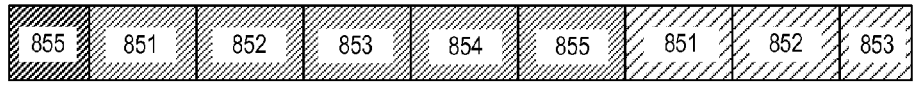
Figure 15B:
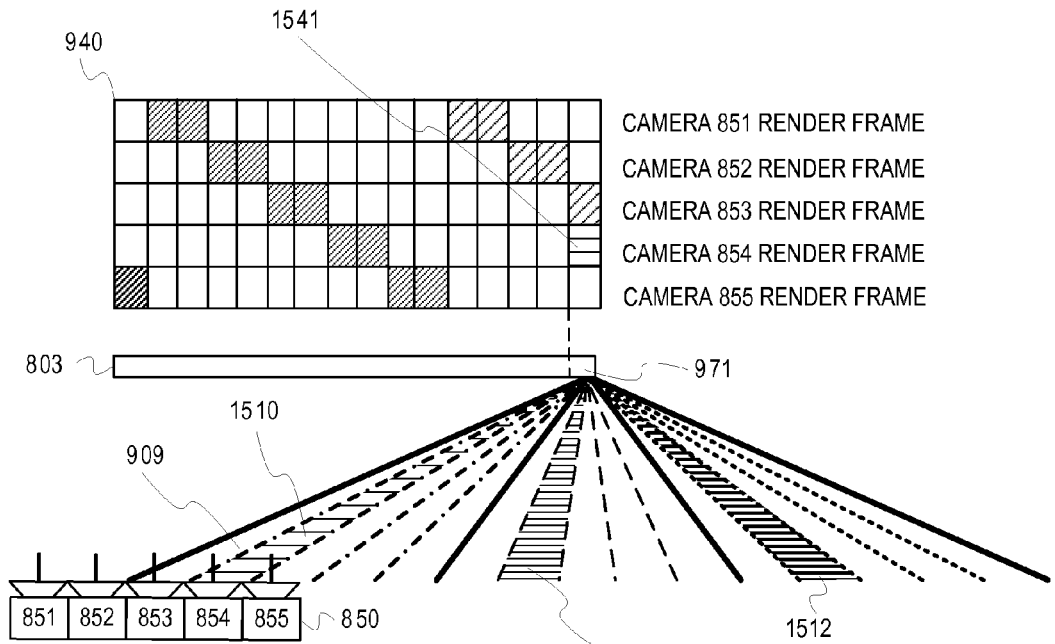
Figure 15C:
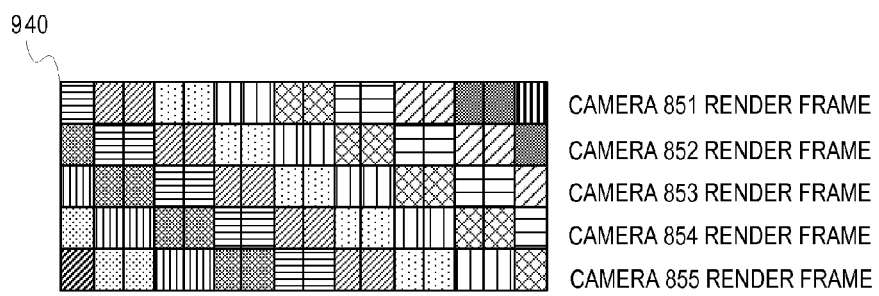

In FIG. 14B, the system reaches the edge of the display 803 and completes entries in the buffer 940 concerning the views of the diagonal-lined view designations. FIG. 15A shows a view for the diagonal-lined designation as segmented by camera. Therefore, in FIG. 15B, the system returns to the processing block 710 for a second view designation (i.e., for the horizontal-lined view designation) and returns to the right edge of the display 803. For instance, in FIG. 15B, the system determines that the optical unit at 971 projects the view 1510 toward the camera rig 850 and view 1510 aligns with camera 854. The system writes a buffer pixel 1541 to the buffer 940 for the camera 854 render frame. Then the system repeats processing block 714 from the right edge of the display 803 to the left for all of the horizontal-lined view designations 1510, 1511, and 1512 that may intersect a camera on the camera rig 850 until reaching the right edge of the display 803, then repeats for all view instances of the next view designation (e.g., cross-hatched views), then for all view instances of the next view designation (e.g., vertical-lined views), then for all view instances of the next view designation (e.g., dotted views) until the entire buffer 940 is filled as shown in FIG. 15C.

In alternative embodiments, instead of repeating the processing block 714 multiple times across the display 803 for different view designations, the system can as described in the Figures of 8A through 15B), the system can instead perform an inverted version of the repeating subroutine where, for a given optical unit (e.g., at location 971) the system detects all views that align with any of the cameras of the camera rig and generates buffer pixels for those views before moving to the next optical unit at the next location (e.g., location 1072) on the display 803. Then the system would repeat the operations of processing blocks 716 and 718 for all views that align with any of the cameras of the camera rig 850 for the next location (i.e., location 1072), and so forth.

Yet other alternate embodiments can generate the buffered image based on movement other than right to left across the display, such as from left to right, or in some other pattern (e.g., center of display outward to the left and then from center of the display to the right). In some embodiments, the operations associated with processing blocks 716 and 718 can be performed concurrently for more than one optical unit (e.g., more than buffer pixel can be generated concurrently). The number of repetitions can further depend on a number of pixel columns that the display projects (i.e., can depend on the number of optical units that are aligned in a row across the display). Furthermore, the process can be repeated for only a portion of an autostereoscopic display and does not need to be done for the full length of the autostereoscopic display. For example, if 3D content is displayed on only a portion of the autostereoscopic display, and the rest of the autostereoscopic display only presents 2D content, then the system only needs to perform the process associated with FIG. 7 for the portion (s) of the autostereoscopic display that present the 3D content.

Returning momentarily to the description of FIG. 7, the flow 700 continues at processing block 720, where the system renders the content to the display. In some embodiments, the system renders the pixel images in the buffer to the optical units of the display. The optical units (e.g., the lenticular lenses) project images of the pixels via the various views of the display. The system consistently tracks the player's position and continuously updates the image on the display based on the player's position. Because the image is generated based on the player's position, according to some embodiments, if the player moves laterally, the image on the display will not appear to have a distinguishable wrap-around distortion. In other words, if the viewer were to move slightly horizontally such that their view moved into a neighboring view zone, the transition between view zones would be substantially seamless, thus reducing the distortion effect that can appear when moving between view zones. If, the eye tracking system is fast enough and accurate enough to track the exact player's position, then the system recalculates the optimal views and refreshes the buffer so that the user never encounters an appearance of a transition between view zones. In other words, the optimal view zone follows the viewer's movements. For any other viewer that is not the player (e.g., an onlooker), then their view may have a wrap-around effect. Nevertheless, in gaming, the player is paying for the entertainment, and the onlooker is not, so optimizing the view for the viewer is preferable to increase the chances of the player playing longer and spending more money on gambling.

FIG. 16 is a flow diagram ("flow") 1600 illustrating presenting autostereoscopic gaming content according to viewer position, according to some embodiments. FIGS. 17A, 17B, 17C, 18A, 18B, 18C, 19A, 19B, 19C, 20A and 20B (collectively FIGS. 17A through 20B) are conceptual diagrams that help illustrate the flow of FIG. 16, according to some embodiments. This description will present FIG. 16 in concert with FIGS. 17A through 20B. In FIG. 16, the flow 1600 begins at processing block 1602, where a wagering game system ("system") determines a player's position in physical space relative to a viewing surface of an autostereoscopic 3D display ("display") and determines a physical distance of the player from the display given the player's position. In some embodiments, the system determines the player's position as similarly described for the processing block 702 of FIG. 7. For example, in FIG. 17A, the system detects a location 1701 of a viewer relative to a viewing surface of an autostereoscopic display ("display") 1703. Further, in FIG. 17B the system determines a distance 1704 from the display 1703 of the viewer at the position 1701.

Returning momentarily to the description of FIG. 16, the system processes a nested repeating subroutine (e.g., a "for" loop with three nested loops) as illustrated at processing blocks 1606, 1608, and 1610. The operations associated with the nested repeating subroutine will first be presented as they appear in FIG. 16, then a specific example of the repeating subroutine will be discussed. The flow 1600 continues at processing block 1606, where a first of the nested for loops repeats for each given view designation in a view zone (until all given view instances of the nested for loop 1608 are processed). The flow 1600 continues at processing block 1608, where the system processes a second of the nested loops, at processing block 1608. In the second nested for loop, the loop repeats for each given view instance, of the given view designation of the for loop described at processing block 1606, that is closest to the viewer's position as measured linearly in parallel with a viewing surface of the display. The flow 1600 continues at processing block 1610, where the system repeats a loop for each given one of the plurality of optical units (for each "given optical unit") associated with the 3D content (for each of the given view instances of the repeated iterations of the for loop at processing block 1608 until all of the optical units of the 3D content are processed. The loops of processing blocks 1606, 1608, and 1610 are similar to the loops of processing blocks 710, 712, and 714, and various alternatives discussed in connection with FIG. 7 also apply to the discussion associated with FIG. 16.

A specific example of the subroutine of processing blocks 1606, 1608, and 1610 will now be discussed. Regarding processing block 1606, the system selects a given view designation with a given instance, mentioned in 1608, that is closest to the viewer, until all given view instances in 1608 are processed. The system then selects a next of the view designations with a given instance that is next closest to the viewer's position, etc. until doing so for all view designations.

Regarding processing block 1608, the system selects a given view instance (e.g., view instance 1709) of the given view designation (e.g., the view designation to the far left of the views within a view zone) because the view instance 1709 is closest to the player's position ("position") 1701 as measured linearly in parallel with the display 1703. The system repeats processing block 1610 (continuing across the display 1703 from right to left) for the view instance 1709 until another of the view instances (e.g., view instance 1710) moves closer to the position 1701 than the view instance 1709 (which is described in more detail further below at FIG. 19B). Likewise the system repeats processing block 1610 (continuing across the display 1703 from right to left from the point where the view instance transitioned from 1709 to 1710) for the view instance 1710 until the view instance 1711 is closer to the viewer position than the view instance 1710 (as described in more detail in FIG. 19C).

Regarding processing block 1610, the system selects a given one of the plurality of optical units (e.g., select a first optical unit 1771 as described in FIG. 17B) at a given location on the display 1703 starting at one edge of the 3D image, then the system moves to the next given one of the plurality of optical units of the 3D content (e.g., select a second optical unit 1772 as described in FIG. 17C), until all of the given ones of the plurality of optical units associated with the 3D content are processed (e.g., start at the far right edge of the 3D content and move to each adjacent one of the optical units until reaching the far left edge of the 3D content). The given location of the given one of the plurality of optical units corresponds to a portion of an image of the gaming content that corresponds to a given pixel grouping (pixel column) associated with the given optical unit of the display at the given location.

Returning momentarily to the description of FIG. 16, the flow 1600 continues at processing block 1612, where the system constructs a camera for the given optical unit (of 1610) for the given view instance (of 1608) of the given view designation (of 1606). For example, in FIG. 17B, the system constructs a camera 1751 at the intersection of the plane 1707 in the center of the view instance 1709 and a line 1708, at the distance 1704, parallel to the top or bottom edge of the display 1703 passing through the viewer position 1701. The system aligns the center of the constructed camera 1751 with the plane 1707.

Returning momentarily to the description of FIG. 16, the flow 1600 continues at processing block 1614, where the system sets the constructed camera's frustum to align with a pixel column for the given optical unit. In some embodiments, such as in FIG. 17B, the system aligns the focus of the camera 1751 with the edges 1744 of the pixel grouping of the optical unit 1771. The edges of the frustum align with the corners of the region of the display 1703 to which the frustum is being rendered. In other words, the frustum of the camera 1751 aligns to the viewing angle between the optical unit 1771 and the camera 1751. Thus, the frustum is set in accordance with an approximate viewing angle for the view 1709 according to the position of the camera 1751 (see FIG. 9B for an example description of determining a viewing angle (e.g., 905) of a view (e.g., 909)).

Returning momentarily to the description of FIG. 16, the flow 1600 continues at processing block 1616, where the system configures the constructed camera to render the pixel column's content. In some embodiments, the system generates (i.e., renders from virtual space) a graphical buffer pixel that corresponds to the given location of the given optical unit, which pixel includes an image of gaming content that is perceptible at the given location for the given view instance for the constructed camera (similarly as described in FIG. 7 at processing block 718). The system can generate the buffer pixel after each iteration of the repeated loop at processing block 1610. After the first iteration of the repeating process at processing block 1610, the system continues for additional optical units that project the view instance 1709 so long as view instance 1709 is closer to the position 1701 than view instance 1710. For instance, in FIG. 17C, the system repeats processing block 1610 for a location of the display 1703 of the second optical unit 1772 and determines, according to the views of the second optical unit 1772, where the view instance 1709 encounters the line 1708. The second optical unit 1772 is adjacent to the location of the first optical unit 1771 on the display 1703 and corresponds to a second pixel column on the display 1703. The system generates a second camera 1752 at the location where the view 1709 and the line 1708 intersect. Then, referring to FIG. 18A, the system repeats processing block 1610 and generates a third camera 1853 for a third optical unit 1873 adjacent to the second optical unit 1772. Then, referring to FIG. 18B, the system repeats processing block 1610 and generates a fourth camera 1854 for a fourth optical unit 1874 adjacent to the third optical unit 1873. Then, referring to FIG. 18C, the system repeats processing block 1610 and generates a fifth camera 1855 for a fifth optical unit 1875 adjacent to the fourth optical unit 1874. Then, referring to FIG. 19A, the system repeats processing block 1610 and generates a sixth camera 1956 for a sixth optical unit 1976 adjacent to the fifth optical unit 1875.

Figure 19A:
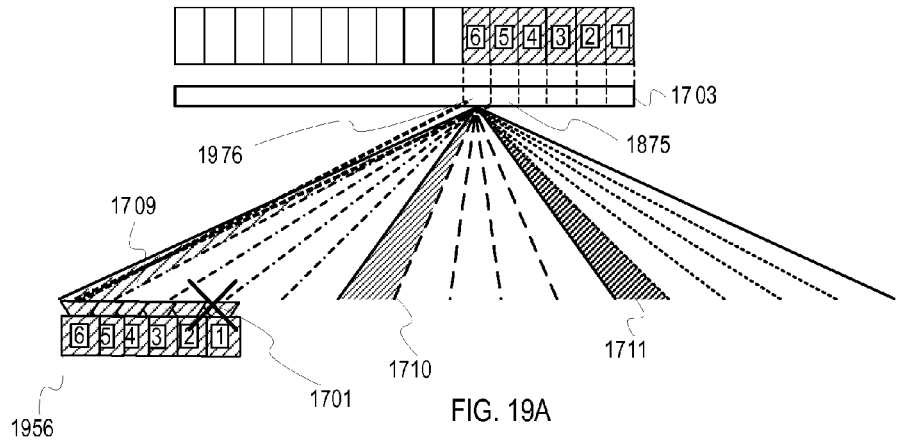
Figure 19B:
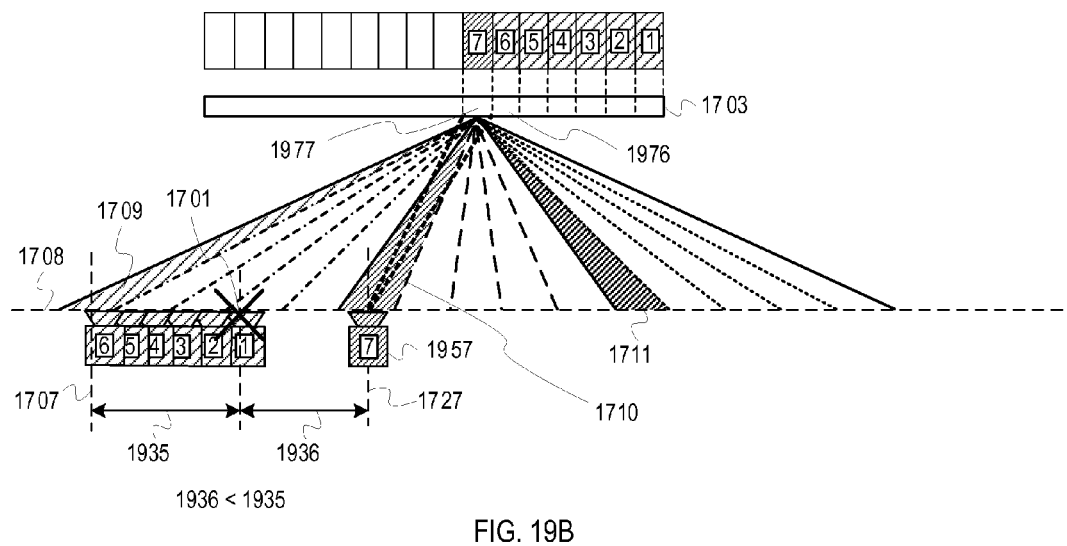

In FIG. 19B, the system repeats processing block 1610 for a seventh optical unit 1977 adjacent to the sixth optical unit 1976. However, at this point the view instance 1709 is further in distance 1935 from the position 1701 than a distance 1936 of the view instance 1710. Therefore, the system continues to a second iteration of processing block 1608, which second iteration of processing block 1608 corresponds to the second view instance 1710 (as similarly described in FIG. 7, the system does not increase to a next iteration of the loop at processing block 1610 at this moment but instead goes to processing block 1612). The system generates a seventh camera 1957 and positions the camera 1957 at the intersection of the plane 1727 in the center of the view instance 1710 and the line 1708 mentioned previously. The system then repeats the processing block 1610 across the display 1703 from left to right continuing from optical unit 1977 constructing additional cameras (i.e., an eighth, ninth, tenth, eleventh, twelfth, thirteenth, fourteenth, and fifteenth virtual camera) until the view instance 1711 is closer to the position 1701 than the view instance 1710 as depicted in FIG. 19C.

Figure 19C:
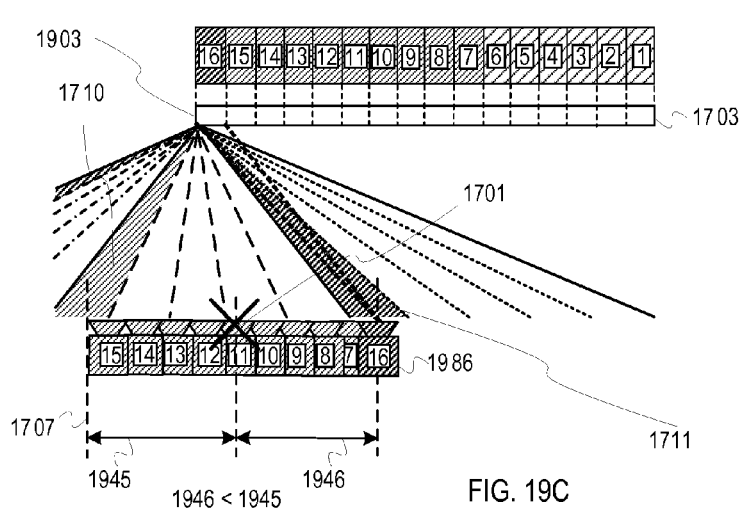

In FIG. 19C, a distance 1946 of line 1727, through the center of the view instance 1711, is closer to the position 1701 than a distance 1945 of the line 1707, of the view instance 1710, to the position 1701. Therefore, at the iteration described in FIG. 19C, the system generates a camera 1986 (i.e., a sixteenth camera). At this point, after generating the camera 1986, the system has reached the far edge (e.g., a left edge 1903) of the 3D content for the display 1703. Thus, the system has completed all iterations of the repeating process at processing block 1606 for the first view designation (i.e., all of the diagonal-lined view designations associated with the 3D content). The system then processes processing block 1606 for a next view designation (e.g., horizontal-lined view designations), repeating also processing blocks 1608 and 1610 as similarly described above across the display 1703. The system can further repeat processing block 1606 (and all nested repeats) for all other view designations (e.g., the crosshatched view designations, vertical-lined view designations, and so forth), generating graphical buffer pixels until filling a buffer with a completed image that corresponds to the position 1701 of the viewer.

Returning momentarily to the description of FIG. 16, the flow 1600 continues at processing block 1618, where the system renders the content to the display according to the constructed cameras. For instance, the system renders the buffer pixel images from the buffer to the display, which buffer pixel images were generated from the nested repeating subroutines of FIG. 16.

Figure 20A:
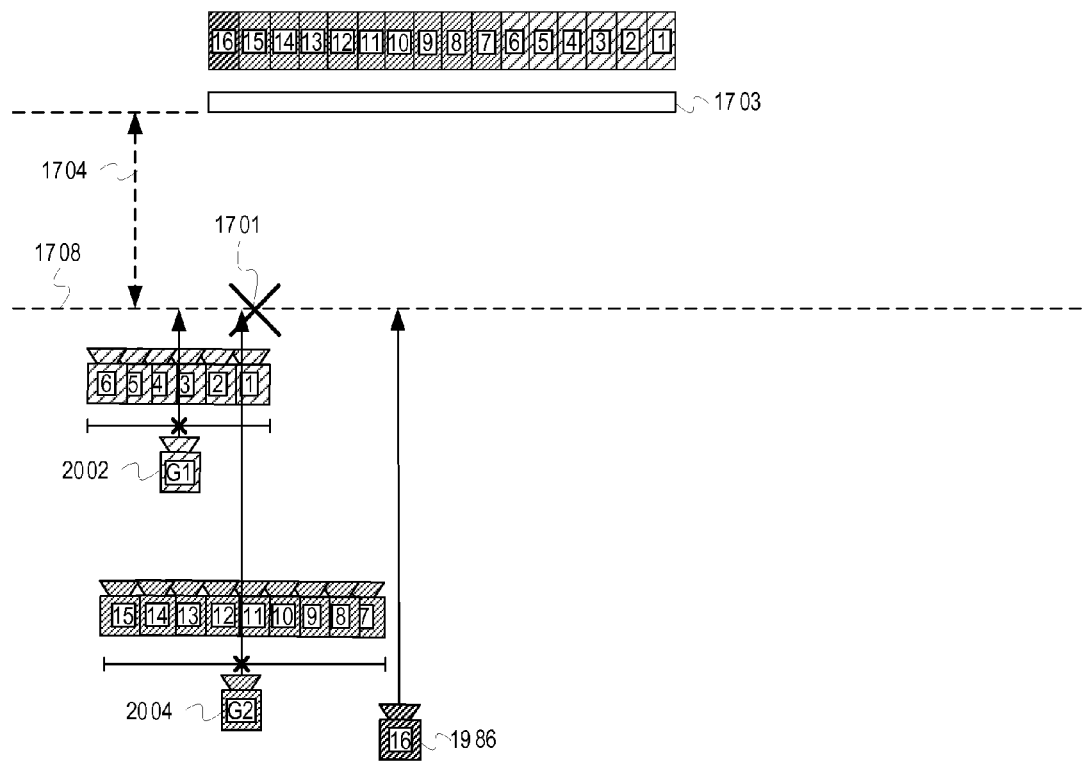
Figure 20B:
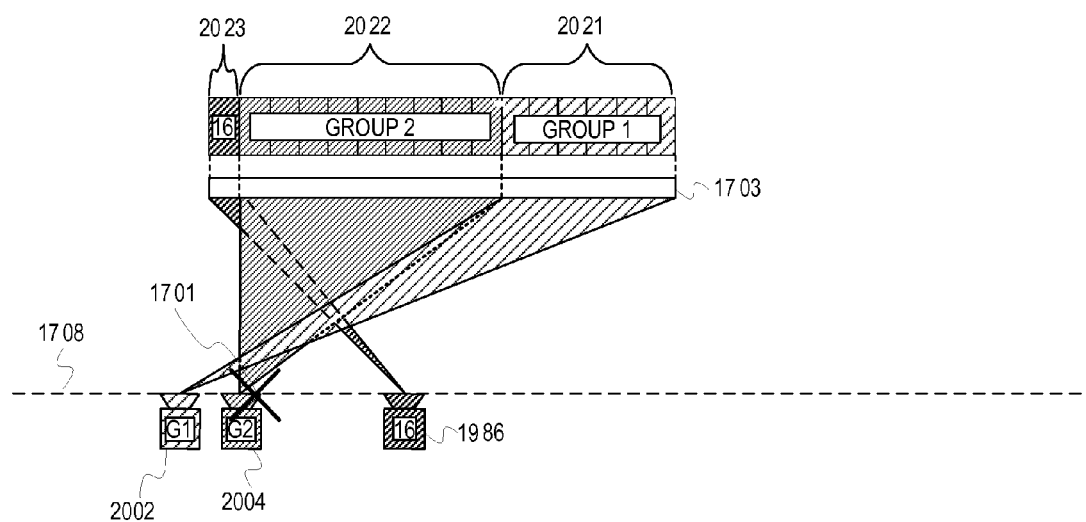

In some embodiments, the system can generate a graphical buffer pixel for each generated camera after each iteration of the nested repeating subroutine. However, alternatively, as shown in FIGS. 20A-20B, the system can group adjacent cameras rendering to adjacent pixel columns into a single mathematically-equivalent camera. For example, as in FIG. 20A, the system groups contiguous columns into single cameras positioned at a centroid of a respective block of separate cameras. For example, the grouping of cameras 1-6 (generated for the view instance 1709) are grouped into a new camera 2002 positioned at a centroid of the group of cameras 1-6. Further, the grouping of cameras 7-15 (generated for view instance 1710) are grouped into camera 2004 positioned at a centroid of the group of cameras 7-15. Camera 1986 (camera 16 generated for the view instance 1711) is not grouped because it is only one camera. In FIG. 20B, the cameras 2002, 2004, and 1986 are placed at the line 1708. The system sets the frustum for camera 2002 to the width 2021 that spans the area associated with cameras 1-6. The system then configures camera 2002 to render the pixel columns for the optical units within the width 2021. Furthermore, the system sets the frustum for camera 2004 to the width 2022 that spans the area associated with cameras 7-15. The system then configures camera 2004 to render the pixel columns for the optical units within the width 2022. The system sets the frustum for camera 1986 to the width 2023 of the pixel column for the optical unit within the width 2023. The system then configures the camera 1986 to render the pixel columns for the optical unit within the width 2021.

In some embodiments, the techniques described in FIGS. 20A-20B result in a similar view render buffer as the process of generating a separate buffer pixel for each camera described in FIGS. 17A through 19C. However, the techniques of FIGS. 20A-20B may result in a lower quality image. Consequently, the system can utilize a technique described in the following paragraphs and which are illustrated in FIG. 21.

With regard to the grouping of cameras, the grouping of cameras can reduce the complexity associated with large numbers of camera by reducing the number of cameras. Such reduction greatly optimizes the system. However, grouping cameras can create image defects. To correct the image defects, additional techniques can be implemented. In some embodiments, alignment of view frusta for head-tracking, as mentioned previously at processing block 708, uses an "off-axis perspective" camera projection matrix which defines a view frustum converging at the viewer's location, passing through the four corners of the screen (or segment thereof), and preserving the render image plane parallel with the physical display. However, in order to achieve the desired effect of an entire grouped segment of columns being rendered from the same horizontal angle, the segment must be rendered with a camera constructed to render uniformly from a given angle. In other words, the system must utilize a skew-orthographic camera projection matrix when establishing three-dimensional virtual "projection" space. Therefore, any individual camera replacing such a camera group cannot use a pure perspective projection or a pure orthographic projection. Instead, any such grouping of cameras approximates a camera which is off-axis-perspective in the vertical direction and skew-orthographic in the horizontal direction. The rendering system must take special considerations into account to allow the creation of such a camera.

Three-dimensional virtual projection space is different from the previously mentioned three-dimensional virtual "world" space, as will be understood by one skilled in the art of graphics rendering. More specifically, during an initial stage of rendering, a virtual camera is configured to capture an image of virtual objects that have been arranged in a virtual scene on a fixed coordinate system referred to as virtual "world space." When the virtual camera renders a given image or animation frame (i.e., during subsequent stages of the rendering process) the system performs a rendering process that converts and/or manipulates coordinates of the virtual objects in the captured virtual scene for various purposes. One of the purposes is to recalculate coordinates of all virtual objects in the scene relative to "camera space," to assist in determining where virtual objects are relative to the virtual camera (e.g., whether objects are above, below, left, right, in front of, or behind the virtual camera). Another one of those purposes is to generate distortions to an appearance of a captured virtual scene, such as distortions according to directionality, perspective, point-of-view, skew, offset, tapering, and so forth. After the system converts and/or manipulates coordinates of the virtual objects in the virtual scene according to some stages of the rendering process, such as to recalculate coordinates according to camera space and to generate distortions to a captured virtual scene, a coordinate system is achieved that is referred to a virtual projection space ("projection space"). The projection space contains, within a right-angle cube, everything that would have been in a frustum of the virtual camera according to the parameters set for the virtual camera (e.g., according to position of the camera at an apex of the frustum, according to an alignment of the camera with a viewing angle of the virtual scene, etc.) based on any given distortion factors mentioned previously (e.g., directionality, perspective, point-of-view, skew, offset, tapering, and so forth). In projection space, the system can then perform clipping and flattening of the image within the volume of the right-angle cube mentioned previously. Further, in projection space, the system can feed coordinates of on-screen polygons (e.g., 3D graphical polygons that result from the conversions and manipulations to the images of the virtual objects captured in the virtual scene) to a vertex shader which can manipulate the coordinates so as to appear to be anywhere eke in projection space. In some embodiments, the system uses a vertex shader to coerce the appearance of objects in projection space into apparently orthographic locations after they have been distorted for perspective. Furthermore, after clipping occurs the system can utilize a fragment shader to return colors for pixels that need to be drawn and the system writes the colors to an image buffer.

In some embodiments, during the rending process, the system utilizes a projection matrix to distort all (x,y,z) vertex coordinates in a frustum-shaped region of a virtual scene into a uniform cube, and then flatten the contents of that cube into a 2D rectangle. Furthermore, the system stores all (x,y,z) vertex coordinates as extended (x,y,z,w) 4-dimensional vectors. All vertex transformations are described in 4×4 matrices which are capable of setting w as a function of x, y, and/or z. Just before rendering, all (x,y,z) coordinates are uniformly multiplied by 1.0/w in the graphics hardware. Thus, if the 4×4 projection transformation matrix sets w as a function of the point's depth-from-viewer (usually z), all points will be scaled by their distance from the camera, and uniform perspective will be achieved. If the matrix sets w to 1.0, all points are unscaled and a uniform orthographic view will be obtained. Because the division by w occurs automatically use of a projection matrix alone will not treat the horizontal projection axis differently than the vertical projection axis. Therefore, in some embodiments, the system intercepts the projection transformation after the projection matrix is applied but before coordinates are fed out to the final rendering stage and implicit division-by-w. The system can thus pre-multiply by w any coordinate to effectively not have it divided by w. The system, therefore, constructs a projection matrix (e.g., matrix 2105 as depicted in FIG. 21) which applies the typical off-axis perspective transformation to a vertex's y and z coordinates anticipating w, but applies to the vertex's x coordinate the transformation which would yield the correct skew-orthographic transformation if w were set to 1.0. (which, at this point, it is not, because w is needed for the y and z perspective). The system, therefore, uses the projection matrix in conjunction with a customized "vertex shader" program running on graphics hardware. After the system applies the model/view/projection matrix multiplications normally, the system uses the vertex shader to actively multiply the outbound vertex data's x coordinate by its w, thus ensuring y and z get the benefit of w-perspective scaling, but when w is applied to x, it returns to its correct orthographic position. The system dynamically corrects the vertex's normal vector as needed as well as light locations in the fragment shader. This process allows for correct construction of a horizontal-skew-orthographic/vertical-off-axis-perspective (HSO/VOAP) camera (e.g., camera 2151 as depicted in FIG. 21), which in turn allows a single proposed camera to correctly replace a group of multiple cameras without altering the rendered image, thereby yielding an order-of-magnitude reduction in processing overhead.

Additional Example Embodiments

According to some embodiments, a wagering game system ("system") can provide various example devices, operations, etc., to present autostereoscopic gaming content according to viewer position. The following non-exhaustive list enumerates some possible embodiments.

Presenting Autostereoscopic Content for Displays Set on a Bias.

Some autostereoscopic displays have optics that are set on a bias. Such autostereoscopic displays have sequential sub-pixels on sequential image rows that form a single 3D-image pixel. Therefore, the pixel-to-view mapping for one image row does not match the mapping for the next row. In some embodiments, if either of the processes of FIG. 7 or FIG. 16 are applied to an autostereoscopic display with optics set on a bias, the processes described in FIG. 7 or FIG. 16 may need to be applied to every column of every row of the view images independently rather than to entire columns of the view images at once.

Presenting Autostereoscopic Content for Non-Ideal Displays.

Some autostereoscopic displays have optical properties that are non-ideal, which can result in some ghosting or bleed-through from one view to another even when the processes of either FIG. 7 or FIG. 16 are applied. The system, therefore, before selecting a camera (e.g., prior to operations associated with processing block 716) or before setting a camera position (e.g., prior to operations associated with processing block 1614), can assess the difference between the player's position and a view's projected angle. If this difference exceeds a set threshold, the view may be safely omitted (and, e.g., simply rendered black or some other predefined color) for this optical unit to both improve rendering time and decrease the content, which may be undesirably ghosted. While not physically correct, the "depth effect" of either method may be adjusted by scaling the computed spacing of the cameras about the viewer's position. Cameras spaced more narrowly than the physical view angle profile of the display will result in a depth-compressed image with less pop/recede. This will in turn reduce ghosting if the display is non-ideal, and may provide a more comfortable viewing experience. Cameras spaced wider than the display's native viewing angles will produce a depth-extended image but may increase ghosting and may cause other artifacts around the view seams.

Anti-Aliased Presentation for Multiple Viewers.

In some embodiments, the system can track the areas that multiple viewers are looking at on an autostereoscopic display ("display") and perform one or more techniques according to embodiments, for each area that each of the respective viewers is looking at based on distances from the display for each of the respective viewers. For instance, in some embodiments, the system repeats some, or all, of the elements of FIGS. 3, 7, and/or 16 for different contiguous regions of the display based on locations of multiple viewers. If one of the viewers has a higher priority than other viewers (e.g., one of the viewers is a paying casino patron and the others are merely observers), and if there is conflict in one of the areas (e.g., the paying casino patron and an observer are looking at the same area), the system can place a higher priority on the paying casino patron and optimize the views for the position of the paying casino patron over that of the observer. In other embodiments, however, multiple viewers are paying patrons, such as in a community wagering game where multiple players play a single game. In such an example, 3D content for the community game may be presented via a centralized display for all players to view. The system may indicate to the players assigned areas within which the specific players should look and then optimize those areas for the specific players' positions and distances. In other embodiments where the 3D effect may move across a display for all viewers to see, the system can enter a mode that assumes that the player will maintain their positions in physical space for the short duration of when the moving 3D effect is presented across the display. In that mode, the system optimizes only the views projected at the specific player based on the location of the specific player.

Example Operating Environments

This section describes example operating environments, systems, networks, etc. and presents structural aspects of some embodiments. More specifically, this section includes discussion about wagering game systems.

FIG. 22 is a conceptual diagram that illustrates an example of a wagering game system architecture 2200, according to some embodiments. The wagering game system architecture 2200 can include an account server 2270 configured to control user related accounts accessible via wagering game networks and social networking networks. The account server 2270 can store wagering game player account information, such as account settings (e.g., settings related to default enablement of 3D modes, settings related to a type of 3D technology to use to present 3D, settings related to parallax, settings related to social contacts, etc.), preferences (e.g., player preferences 3D presentation), player profile data (e.g., name, avatar, screen name, etc.), and other information for a player's account (e.g., financial information, account identification numbers, virtual assets, social contact information, etc.). The account server 2270 can contain lists of social contacts referenced by a player account. The account server 2270 can also provide auditing capabilities, according to regulatory rules. The account server 2270 can also track performance of players, machines, and servers.

The wagering game system architecture 2200 can also include a wagering game server 2250 configured to control wagering game content, provide random numbers, and communicate wagering game information, account information, and other information to and from the wagering game machine 2260. The wagering game server 2250 can include a content controller 2251 configured to manage and control content for presentation on the wagering game machine 2260. For example, the content controller 2251 can generate game results (e.g., win/loss values), including win amounts, for games played on the wagering game machine 2260. The content controller 2251 can communicate the game results to the wagering game machine 2260. The content controller 2251 can also generate random numbers and provide them to the wagering game machine 2260 so that the wagering game machine 2260 can generate game results. The wagering game server 2250 can also include a content store 2252 configured to contain content to present on the wagering game machine 2260. The wagering game server 2250 can also include an account manager 2253 configured to control information related to player accounts. For example, the account manager 2253 can communicate wager amounts, game results amounts (e.g., win amounts), bonus game amounts, etc., to the account server 2270. The wagering game server 2250 can also include a communication unit 2254 configured to communicate information to the wagering game machine 2260 and to communicate with other systems, devices and networks.

The wagering game system architecture 2200 can also include a wagering game machine 2260 configured to present wagering games and receive and transmit information to coordinate, present, and control presentation of 3D elements in 2D gaming environments according to some embodiments. The wagering game machine 2260 can include a content controller 2261 configured to manage and control content and presentation of content on the wagering game machine 2260. The wagering game machine 2260 can also include a content store 2262 configured to contain content to present on the wagering game machine 2260. The wagering game machine 2260 can also include an application management module 2263 configured to manage multiple instances of gaming applications. For example, the application management module 2263 can be configured to launch, load, unload and control applications and instances of applications. The application management module 2263 can launch different software players (e.g., a Microsoft® Silverlight™ Player, an Adobe® Flash® Player, etc.) and manage, coordinate, and prioritize what the software players do. The application management module 2263 can also coordinate instances of the server applications in addition to local copies of applications. The application management module 2263 can control window locations on a wagering game screen or display for the multiple gaming applications. In some embodiments, the application management module 2263 can manage window locations on multiple displays including displays on devices associated with and/or external to the wagering game machine 2260 (e.g., a top display and a bottom display on the wagering game machine 2260, a peripheral device connected to the wagering game machine 2260, a mobile device connected to the wagering game machine 2260, etc.). The application management module 2263 can manage priority or precedence of client applications that compete for the same display area. For instance, the application management module 2263 can determine each client application's precedence. The precedence may be static (i.e. set only when the client application first launches or connects) or dynamic. The applications may provide precedence values to the application management module 2263, which the application management module 2263 can use to establish order and priority. The precedence, or priority, values can be related to tilt events, administrative events, primary game events (e.g., hierarchical, levels, etc.), secondary game events, local bonus game events, advertising events, etc. As each client application runs, it can also inform the application management module 2263 of its current presentation state. The applications may provide presentation state values to the application management module 2263, which the application management module 2263 can use to evaluate and assess priority. Examples of presentation states may include celebration states (e.g., indicates that client application is currently running a win celebration), playing states (e.g., indicates that the client application is currently playing), game starting states (e.g., indicates that the client application is showing an invitation or indication that a game is about to start), status update states (e.g., indicates that the client application is not 'playing' but has a change of status that should be annunciated, such as a change in progressive meter values or a change in a bonus game multiplier), idle states (e.g., indicates that the client application is idle), etc. In some embodiments, the application management module 2263 can be pre-configurable. The system can provide controls and interfaces for operators to control screen layouts and other presentation features for the configuring the application management module 2263. The application management module 2263 can communicate with, and/or be a communication mechanism for, a base game stored on a wagering game machine. For example, the application management module 2263 can communicate events from the base game such as the base game state, pay line status, bet amount status, etc. The application management module 2263 can also provide events that assist and/or restrict the base game, such as providing bet amounts from secondary gaming applications, inhibiting play based on gaming event priority, etc. The application management module 2263 can also communicate some (or all) financial information between the base game and other applications including amounts wagered, amounts won, base game outcomes, etc. The application management module 2263 can also communicate pay table information such as possible outcomes, bonus frequency, etc.

In some embodiments, the application management module 2263 can control different types of applications. For example, the application management module 2263 can perform rendering operations for presenting applications of varying platforms, formats, environments, programming languages, etc. For example, the application management module 2263 can be written in one programming language format (e.g., JavaScript, Java, C++, etc.) but can manage, and communicate data from, applications that are written in other programming languages or that communicate in different data formats (e.g., Adobe® Flash®, Microsoft® Silverlight™, Adobe® Air™, hyper-text markup language, etc.). The application management module 2263 can include a portable virtual machine capable of generating and executing code for the varying platforms, formats, environments, programming languages, etc. The application management module 2263 can enable many-to-many messaging distribution and can enable the multiple applications to communicate with each other in a cross-manufacturer environment at the client application level. For example, multiple gaming applications on a wagering game machine may need to coordinate many different types of gaming and casino services events (e.g., financial or account access to run spins on the base game and/or run side bets, transacting drink orders, tracking player history and player loyalty points, etc.).

The wagering game machine 2260 can also include a 3D presentation module 2264 configured to control presentation of 3D gaming objects via an autostereoscopic display based on player position.

The wagering game system architecture 2200 can also include a secondary content server 2280 configured to provide content and control information for secondary games and other secondary content available on a wagering game network (e.g., secondary wagering game content, promotions content, advertising content, player tracking content, web content, etc.). The secondary content server 2280 can provide "secondary" content, or content for "secondary" games presented on the wagering game machine 2260. "Secondary" in some embodiments can refer to an application's importance or priority of the data. In some embodiments, "secondary" can refer to a distinction, or separation, from a primary application (e.g., separate application files, separate content, separate states, separate functions, separate processes, separate programming sources, separate processor threads, separate data, separate control, separate domains, etc.). Nevertheless, in some embodiments, secondary content and control can be passed between applications (e.g., via application protocol interfaces), thus becoming, or falling under the control of, primary content or primary applications, and vice versa. In some embodiments, the secondary content can be in one or more different formats, such as Adobe® Flash®, Microsoft® Silverlight™, Adobe® Air™, hypertext markup language, etc. In some embodiments, the secondary content server 2280 can provide and control content for community games, including networked games, social games, competitive games, or any other game that multiple players can participate in at the same time. In some embodiments, the secondary content server 2280 can control and present an online website that hosts wagering games. The secondary content server 2280 can also be configured to present multiple wagering game applications on the wagering game machine 2260 via a wagering game website, or other gaming-type venue accessible via the Internet. The secondary content server 2280 can host an online wagering website and/or a social networking website. The secondary content server 2280 can include other devices, servers, mechanisms, etc., that provide functionality (e.g., controls, web pages, applications, etc.) that web users can use to connect to a social networking application and/or website and utilize social networking and website features (e.g., communications mechanisms, applications, etc.). The secondary content server 2280 can be configured to integrate 3D wagering game elements in 2D gaming environments. In some embodiments, the secondary content server 2280 can also host social networking accounts, provide social networking content, control social networking communications, store associated social contacts, etc. The secondary content server 2280 can also provide chat functionality for a social networking website, a chat application, or any other social networking communications mechanism. In some embodiments, the secondary content server 2280 can utilize player data to determine marketing promotions that may be of interest to a player account. The secondary content server 2280 can also analyze player data and generate analytics for players, group players into demographics, integrate with third party marketing services and devices, etc. The secondary content server 2280 can also provide player data to third parties that can use the player data for marketing.

The wagering game system architecture 2200 can also include an online gaming server 2290 configured to control and present an online website that hosts wagering games. The online gaming server 2290 can also be configured to present multiple wagering game applications on the wagering game machine 2260, on a mobile computing device, on a personal computer, etc. via a wagering game website, or other gaming-type venue accessible via the Internet. The online gaming server 2290 can host an online wagering website and/or a social networking website. The online gaming server 2290 can include other devices, servers, mechanisms, etc., that provide functionality (e.g., controls, web pages, applications, etc.) that web users can use to connect to a social networking application and/or website and utilize social networking and website features (e.g., communications mechanisms, applications, etc.).

Each component shown in the wagering game system architecture 2200 is shown as a separate and distinct element connected via a communications network 2222. However, some functions performed by one component could be performed by other components. For example, the wagering game server 2250 can also be configured to perform functions of the application management module 2263, the 3D presentation module 2264, the secondary content server 2280, the account server 2270, the web server 2290, and other network elements and/or system devices. Furthermore, the components shown may all be contained in one device, but some, or all, may be included in, or performed by, multiple devices, as in the configurations shown in FIG. 22 or other configurations not shown. For example, the account manager 2253 and the communication unit 2254 can be included in the wagering game machine 2260 instead of, or in addition to, being a part of the wagering game server 2250. Further, in some embodiments, the wagering game machine 2260 can determine wagering game outcomes, generate random numbers, etc. instead of, or in addition to, the wagering game server 2250.

The wagering game machines described herein (e.g., wagering game machine 2260) can take any suitable form, such as floor standing models, handheld mobile units, bar-top models, workstation-type console models, surface computing machines, etc. Further, wagering game machines can be primarily dedicated for use in conducting wagering games, or can include non-dedicated devices, such as mobile phones, personal digital assistants, personal computers, etc.

In some embodiments, wagering game machines and wagering game servers work together such that wagering game machines can be operated as thin, thick, or intermediate clients. For example, one or more elements of game play may be controlled by the wagering game machines (client) or the wagering game servers (server). Game play elements can include executable game code, lookup tables, configuration files, game outcome, audio or visual representations of the game, game assets or the like. In a thin-client example, the wagering game server can perform functions such as determining game outcome or managing assets, while the wagering game machines can present a graphical representation of such outcome or asset modification to the user (e.g., player). In a thick-client example, the wagering game machines can determine game outcomes and communicate the outcomes to the wagering game server for recording or managing a player's account.

In some embodiments, either the wagering game machines (client) or the wagering game server(s) can provide functionality that is not directly related to game play. For example, account transactions and account rules may be managed centrally (e.g., by the wagering game server(s)) or locally (e.g., by the wagering game machines). Other functionality not directly related to game play may include power management, presentation of advertising, software or firmware updates, system quality or security checks, etc.

Furthermore, the wagering game system architecture 2200 can be implemented as software, hardware, any combination thereof, or other forms of embodiments not listed. For example, any of the network components (e.g., the wagering game machines, servers, etc.) can include hardware and machine-readable storage media including instructions for performing the operations described herein.

Generating 3D Wagering Game Content

FIGS. 23A-23C are conceptual diagrams that illustrate an example of generating 3D wagering game content, according to some embodiments. FIGS. 23A-23C also illustrate an example of generating a composite image of content from 2D regions and 3D regions according to some embodiments. In FIG. 23A, a wagering game system (e.g., a wagering game machine's graphics unit) creates a virtual 3D game space that includes regions 2305A, 2305B, 2305C and 2304. In FIG. 23A, a first set of virtual cameras 2314 are positioned and oriented to capture images of objects within regions 2305A. The first set of virtual cameras 2314 behave like real-world cameras, as they may have focal length, depth of field, shutter speed, resolution, aperture size, etc. The first set of virtual cameras 2314 can record images at a rate that, upon playback, appears continuous, such as a video camera does. For stereoscopic 3D, two virtual cameras are necessary. A first camera of the first set of the virtual cameras 2314 records a first image for presentation to a viewer's left eye, whereas a second camera of the first set of virtual cameras 2314 records a second image for presentation to the viewer's right eye. The regions 2305B and 2305C, as well as regions 2304, are invisible to the first set of virtual cameras 2314. The system stores the images of regions 2305A in a buffer.

A second set of virtual cameras 2315 (similar to the first set of virtual cameras 2314) are positioned and oriented to capture images of the second region 2305B. Regions 2305A, 2305C and 2304 are invisible to the second set of virtual cameras 2315. A third set of virtual cameras 2316 (similar to the first set of virtual cameras 2314) are positioned and oriented to capture images of region 2305C. Regions 2305A, 2305B, and 2304 are invisible to the third set of virtual cameras 2316. The system renders the regions 2305A, 2305B, and 2305C as stereoscopic 3D images and buffers the 3D images in one or more graphics buffers. The stereoscopic 3D images in the graphics buffer(s) includes first 2D images for presentation to a viewer's left eye, and a second 2D images for presentation to the viewer's right eye. When presented on a stereoscopic 3D display device, the first and second images appear as a stereoscopic 3D image, having an illusion of depth.

In FIG. 23B, a fourth set of virtual cameras 2317 (similar to the first set of virtual cameras 2314) are positioned and oriented to capture images of regions 2304. Regions 2305A, 2305B, and 2305C are invisible to fourth virtual cameras 2317. The system renders the regions 2304 as a 2D image (i.e., without stereoscopic depth) and buffers the 2D image. In some embodiments, only one of the virtual cameras 2317 is used to capture 2D content as only one perspective would need to be recorded and presented to a user's eyes to depict a 2D object.

In some embodiments, the sets of virtual cameras (e.g., sets of virtual cameras 2314, 2315, 2316, and 2317) are configured to capture images of only objects that are within their respective assigned region (e.g., respectively the first set of virtual cameras 2314 are assigned to regions 2305A, the second set of virtual cameras 2315 are assigned to region 2305B, the third set of virtual cameras 2316 are assigned to region 2305C, and the fourth set of virtual cameras 2317 are assigned to regions 2304). The objects within coordinates of a given region may include metadata identifiers that are assigned to the region, and the virtual cameras to which the region are assigned are configured to record only the objects whose identifiers are within the coordinates of the region. All other objects that are outside of the region are invisible to sets of virtual cameras assigned to that region. In some embodiments, the sets of virtual cameras are configured to move if their respective regions move. In some embodiments, one or more of the regions 2305A, 2305B, and 2305C may move around and overlap. In such cases, the system can coordinate which of the sets of virtual cameras will record objects within the intersection of the overlapped regions. In some embodiments, the system transfers objects from one region to another (e.g., modifies the metadata identifiers of the objects to be within the region of another of the virtual cameras). In some embodiments, the system can assign more than one set of virtual cameras to any given region, and the system can further divide regions into sub-regions dynamically. In some embodiments, a grid of virtual cameras is assigned to given regions that abut and encompass the entire viewing area of a display. The system can coordinate movement of objects from one region to another, and turn on and off sets of virtual cameras for recording the objects when the objects pass from one region into another.

In FIG. 23C, the system creates a composite image 2310. The composite image 2310 is comprised of rendered 3D content from regions 2305A, 2305B, and 2305C and rendered 2D content from regions 2304 via a display capable of presenting both 2D and 3D images. In FIGS. 23A-23C, some of the regions 2304 are contained within the regions 2305A such that 2D content can be surrounded by 3D content. The system can utilize multiple buffers and overlay images within the buffers to generate the composite image 2310. For example, the system can include a separate buffer for each set of virtual cameras. The objects contained within the regions assigned to the virtual cameras. Each set of virtual cameras record and store in their respective buffers the images of the objects in their assigned regions according to a common timeline. The system then concurrently overlays each of the buffered images stored in each of the buffers and presents them according to the common timeline.

It should be noted that in some embodiments, like in FIGS. 23A-23C, multiple sets of virtual cameras are used concurrently, however in other embodiments only one set of virtual cameras is used at different times and buffered according to separate timelines. The system later synchronizes the timelines and overlays the buffered images according to a synchronized timelines.

In some embodiments, when the system changes presentation of some gaming content from 3D to 2D, the system can align virtual cameras so they are coincident. For example, in FIGS. 23A-23C, the system can align the individual cameras from each set of virtual cameras 2314, 2315, 2316 (i.e., move each camera from each set of virtual cameras together, such as moving together the two cameras from the first set of the virtual cameras 2314 so that they capture only one perspective of the content they are assigned to). When the system renews tracking, and then gradually phases back into 3D (i.e., progressively restores 3D depth), the system can gradually re-space or re-separate the two cameras from the set until the cameras have re-spaced to an optimal, default position for presentation of the 3D content. For example, in FIGS. 23A-23C, the system can gradually re-separate the camera pairings for any of the sets of virtual cameras 2314, 2315, and 2316. In some embodiments, instead of, or in additional to, moving the spacing of the sets of virtual cameras 2314, 2315, and 2316, the system can modify a z-depth of a gaming object to cause the gaming object to appear to move closer to, or further away from, the player in 3D space.

Wagering Game Machine Architecture

FIG. 24 is a block diagram illustrating a wagering game machine architecture, according to example embodiments of the invention. As shown in FIG. 24, the wagering game machine architecture 2400 includes a wagering game machine 2406, which includes a central processing unit (CPU) 2426 connected to main memory 2428. The CPU 2426 can include one or more processors, such as one or more Intel® Pentium processors, Intel® Core 2 Duo processors, AMD Opteron™ processors, UltraSPARC processors, etc. The main memory 2428 includes a wagering game unit 2432. In one embodiment, the wagering game unit 2432 can present wagering games, such as video poker, video black jack, video slots, video lottery, etc., in whole or part.

The main memory 2428 also includes a graphics engine 2435 that can use stereoscopic 3D graphics and 2D graphics to present gaming images according to player position. The graphics engine 2435 can operate in concert with a video adapter 2431 and graphics buffer 2437, which together make up a graphics unit 2440. The graphics unit 2440 presents images on an autostereoscopic 3D display device 2434 based on player position relative to the display device 2434. For example, the information reader 2418 may include a player tracking device, such as a camera, to detect player head position, facial elements, etc. relative to a viewing surface of the autostereoscopic 3-D display device 2434. The CPU 2426, in connection with the graphics unit 2440, renders the appearance of 3D content to the graphics buffer 2437 for presentation via the autostereoscopic 3-D display device 2434 based on the information obtained via the information reader 2418 about the location of the player. The video adapter 2431 is also connected to a 2D display device.

In another example, autostereoscopic displays use optical trickery at the display, rather than worn by the user, to ensure that each eye sees the appropriate image. Autostereoscopic displays generally allow the user to move their head a certain amount without destroying the illusion of depth.

In another example, automultiscopic displays include view-dependent pixels with different intensities and colors based on the viewing perspective (i.e., a number of different views of the same scene can be seen by moving horizontally around the display). In most automultiscopic displays the change of view is accompanied by the breakdown of the illusion of depth, but some displays exist which can maintain the illusion as the view changes.

In another example, computer-generated holography utilizes devices that create a light field identical to that which would emanate from an original scene, with both horizontal and vertical parallax across a large range of viewing perspectives.

The CPU 2426 is also connected to an input/output (I/O) bus 2422, which can include any suitable bus technologies, such as an AGTL+ frontside bus and a PCI backside bus. The I/O bus 2422 is connected to a payout mechanism 2408, value input device 2414, player input device 2416, information reader 2418, storage unit 2430, and the video adapter. The player input device 2416 can include the value input device 2414 to the extent the player input device 2416 is used to place wagers. The I/O bus 2422 is also connected to an external system interface 2424, which is connected to external systems 2404 (e.g., wagering game networks).

In one embodiment, the wagering game machine 2406 can include additional peripheral devices and/or more than one of each component shown in FIG. 24. For example, in one embodiment, the wagering game machine 2406 can include multiple external system interfaces 2424 and/or multiple CPUs 2426. In one embodiment, any of the components can be integrated or subdivided.

Furthermore, any component of the wagering game machine 2406 can include hardware, firmware, and/or machine-readable storage media including instructions for performing the operations described herein.

Wagering Game System

FIG. 25 is a conceptual diagram that illustrates an example of a wagering game system 2500, according to some embodiments. In FIG. 25, the wagering game system 2500 includes a wagering game machine 2560 similar to those used in gaming establishments, such as casinos. The wagering game machine 2560 may, in some examples, be referred to as a gaming terminal or an electronic gaming machine. The wagering game machine 2560 may have varying structures and methods of operation. For example, the wagering game machine 2560 may include electromechanical components configured to play mechanical slots. In another example, the 2560 includes electronic components configured to play a video casino game, such as slots, keno, poker, blackjack, roulette, craps, etc. The wagering game machine 2560 is depicted as a floor-standing model. However, other examples of wagering game machines include handheld mobile units, bartop models, workstation-type console models, etc. Further, the wagering game machine 2560 may be primarily dedicated for use in conducting wagering games, or may include non-dedicated devices, such as mobile phones, personal digital assistants, personal computers, etc. Exemplary types of wagering game machines are disclosed in U.S. Pat. No. 6,517,433 and Patent Application Publication Nos. US2010/0062196 and US2010/0234099, which are incorporated herein by reference in their entireties.

The wagering game machine 2560 illustrated in FIG. 25 comprises a cabinet 2511 that may house various input devices, output devices, and input/output devices. By way of example, the wagering game machine 2560 includes a primary display area 2512, a secondary display area 2514, and one or more audio speakers 2516. The primary display area 2512 or the secondary display area 2514 may include one or more of a cathode ray tube (CRT), a high resolution liquid crystal display (LCD), a plasma display, a light emitting diode (LED) display, a three-dimensional (3D) display, a video display, or a combination thereof. In some examples, the primary display area 2512 or the secondary display area 2514 includes mechanical reels to display a wagering game outcome. In some example, the primary display area 2512 or the secondary display area 2514 present a transmissive video display disposed in front of a mechanical-reel display to portray a video image superimposed upon the mechanical-reel display. In FIG. 25, the wagering game machine 2560 is a "slant-top" version in which the primary display 2512 is slanted (e.g., at about a thirty-degree angle toward the player of the wagering game machine 2560). Another example of wagering game machine 2560 is an "upright" version in which the primary display 2514 is oriented vertically relative to the player. The display areas may variously display information associated with wagering games, non-wagering games, community games, progressives, advertisements, services, premium entertainment, text messaging, emails, alerts, announcements, broadcast information, subscription information, etc. appropriate to the particular mode(s) of operation of the wagering game machine 2560. The wagering game machine 2560 includes a touch screen(s) 2518 mounted over the primary or secondary areas, buttons 2520 on a button panel, bill validator 2522, information reader/writer(s) 2524, and player-accessible port(s) 2526 (e.g., audio output jack for headphones, video headset jack, USB port, wireless transmitter/receiver, etc.). It should be understood that numerous other peripheral devices and other elements exist and are readily utilizable in any number of combinations to create various forms of a wagering game machine in accord with the present concepts.

Input devices, such as the touch screen 2518, buttons 2520, a mouse, a joystick, a gesture-sensing device, a voice-recognition device, and a virtual input device, accept player input(s) and transform the player input(s) to electronic data signals indicative of the player input(s), which correspond to an enabled feature for such input(s) at a time of activation (e.g., pressing a "Max Bet" button or soft key to indicate a player's desire to place a maximum wager to play the wagering game). The input(s), once transformed into electronic data signals, are output to a CPU for processing. The electronic data signals are selected from a group consisting essentially of an electrical current, an electrical voltage, an electrical charge, an optical signal, an optical element, a magnetic signal, and a magnetic element.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer readable program code embodied in the medium. The described embodiments may be provided as a computer program product that may include a machine-readable storage medium having stored thereon instructions, which may be used to program a computer system to perform a process according to embodiments(s), whether presently described or not, because every conceivable variation is not enumerated herein. A machine-readable storage medium includes any mechanism that stores information in a form readable by a machine (e.g., a wagering game machine, computer, etc.). For example, machine-readable storage media includes read only memory (ROM), random access memory (RAM), magnetic disk storage media, optical storage media (e.g., CD-ROM), flash memory machines, erasable programmable memory (e.g., EPROM and EEPROM); etc. Some embodiments of the invention can also include machine-readable signal media, such as any media suitable for transmitting software over a network.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments, which are defined only by the appended claims. Each of the embodiments described herein are contemplated as falling within the inventive subject matter, which is set forth in the following claims.

The invention claimed is:

1. A method of operating a gaming system configured to render an autostereoscopic presentation of wagering game content based on a position of a player comprising:
   determining, via electronic scanning by one or more position detection devices of the gaming system, the position of the player in physical world space at a distance from a viewing surface of an autostereoscopic display, wherein the autostereoscopic display includes optical units on the viewing surface configured to project views of the wagering game content with an autostereoscopic three-dimensional effect;
   determining, via digital analysis of the position of the player by at least one of one or more electronic processing units of the gaming system, that one of the views projected by one of the optical units has a viewing angle that that is closer in distance to the position of the player in the physical world space than any other viewing angles of any other ones of the views;
   after determining that the one of the views has the viewing angle that is closer in distance to the position of the player, automatically constructing, via at least one of the one or more electronic processing units, a virtual camera at a position in virtual world space that corresponds to the position of the player in the physical world space; and
   after constructing the virtual camera, graphically rendering, via at least one of the one or more electronic processing units, a portion of the wagering game content that corresponds to pixels of the autostereoscopic display associated with the one of the optical units based on the position of the virtual camera associated with the one of the views having the viewing angle that is closer in distance to the position of the player.

2. The method of claim 1, wherein configuring the virtual camera comprises determining, based on the viewing angle, parameters related to a volume of the virtual world space in which the portion of the wagering game content resides and a plane onto which the volume is flattened, and wherein the graphically rendering, according to the configuring of the virtual camera, comprises rendering the portion of the wagering game content, according to the parameters, to locations in a memory buffer that correspond to the pixels of the autostereoscopic display associated with the one of the optical units.

3. The method of claim 1, wherein the distance from the viewing surface is perpendicular to both the position of the player and the autostereoscopic display and wherein the automatically constructing the virtual camera in the virtual world space that corresponds to the position of the player in the physical world space further comprises constructing the virtual camera at an intersection of a plane in a center of the one of the views and a line parallel to the top or bottom edge of the autostereoscopic display, wherein the line passes through the position of the player at the distance of the player from the autostereoscopic display.

4. The method of claim 1 further comprising:
   determining a distance of the player from the autostereoscopic display, wherein the distance of the player is perpendicular to both the position of the player and the autostereoscopic display;
   positioning a virtual camera rig in the virtual world space, centered at the position in the virtual world space relative to the position of the player in the physical world space, wherein the virtual camera is one of a plurality of virtual cameras on the virtual camera rig; and
   determining that the one of the views projected by the one of the optical units aligns with the virtual camera according to the viewing angle.

5. The method of claim 1, further comprising setting a frustum of the virtual camera to the portion of the wagering game content associated with the one of the optical units.

6. The method of claim 1 further comprising:
   determining the position of the player in the physical world space in response to determining an identity of the player via facial recognition; and
   determining that the identity of the player comports with a player account associated with a wagering game session in which the wagering game content is presented.

7. A gaming system comprising:
   at least one input device configured to receive an indication of a wager to play a wagering game;
   an autostereoscopic display configured to display wagering game content for the wagering game;
   a position tracking device;
   at least one processor; and
   at least one memory device configured to store instructions which, when executed by the at least one processor, cause the gaming system to:
   determine, via scanning by the position tracking device, a position of a player in physical world space relative to a viewing surface of the autostereoscopic display, wherein the autostereoscopic display includes optical units on the viewing surface configured to project views of the wagering game content with an autostereoscopic, three-dimensional effect;
   determine a distance of the player from the autostereoscopic display, wherein the distance is perpendicular to both the position of the player and the autostereoscopic display; and
   repeat, for each one of the optical units associated with the wagering game content, operations configured to
   determine, via digital analysis of the position of the player, that one of the views projected by the one of the optical units has a viewing angle that is closer in distance to the position of the player than any other one of the views,
   after determining that the one of the views has the viewing angle that is closer in distance to the position of the player, automatically construct a virtual camera at a location in virtual world space that corresponds to the position of the player in the physical world space, and after automatically constructing the virtual camera, configure the virtual camera, according to the viewing angle, to render a portion of the wagering game content that corresponds to pixels of the autostereoscopic display associated with the one of the optical units based on the location of the virtual camera associated with the one of the views having the viewing angle that is closer in distance to the position of the player.

8. The gaming system of claim 7, wherein the at least one memory device is further configured to store instructions which, when executed by the at least one processor, cause the gaming system to construct the virtual camera at an intersection of a plane in a center of the one of the views and a line parallel to the top or bottom edge of the autostereoscopic display.

9. The gaming system of claim 7, wherein the instruction to configure the virtual camera in three-dimensional world space according to the viewing angle includes operations configured to determine, based on the viewing angle, parameters related to a volume of three-dimensional projection space in which the portion of the wagering game content resides and a plane onto which the volume of three-dimensional projection space is flattened.

10. The gaming system of claim 9, wherein the at least one memory device is further configured to store instructions which, when executed by the at least one processor, cause the gaming system to render the portion of the wagering game content, according to the parameters, to locations in a memory buffer that correspond to the pixels of the autostereoscopic display associated with the one of the optical units.

11. The gaming system of claim 7, wherein the at least one memory device is further configured to store instructions which, when executed by the at least one processor, further cause the gaming system to set a frustum of the virtual camera to a width of the one of the optical units, wherein the width of the one of the optical units corresponds to the at least the portion of the wagering game content.

12. The gaming system of claim 7, wherein the at least one memory device is further configured to store instructions which, when executed by the at least one processor, cause the gaming system to, via the repeat, construct a plurality of virtual cameras that correspond to one view instance of a view designation projected by the optical units, wherein the plurality of virtual cameras are configured to render adjacent regions of a virtual scene of the virtual world space, construct an additional camera positioned at a centroid of the plurality of virtual cameras, wherein the additional camera is a combination of the plurality of virtual cameras, set a frustum for the additional camera to an area of the autostereoscopic display that corresponds to the adjacent regions of the virtual scene, wherein the area includes a collection of adjacent portions of the wagering game content, and configure the additional camera to render the collection of adjacent portions of the wagering game content.

13. The gaming system of claim 12, wherein the at least one memory device is further configured to store instructions which, when executed by the at least one processor, further cause the gaming system to, generate a collective viewing angle for the additional camera, wherein the collective viewing angle is a collection of viewing angles for the plurality of virtual cameras, and configure the additional camera to render the collection of adjacent portions of the wagering game content according to the collective viewing angle.

14. The gaming system of claim 12, wherein the instruction to configure the additional camera comprises utilizing a perspective projection matrix or an off-axis perspective projection matrix with an orthographic component or a skew-orthographic component on at least one axis of three-dimensional projection space and a vertex shader configured to counteract perspective distortion on the at least one axis.

15. One or more non-transitory, machine-readable storage media having instructions stored thereon, which when executed by a set of one or more processors of a gaming system cause the set of one or more processors to perform operations comprising:

determining, via scanning by a position tracking device of the gaming system, a position of a player in physical world space relative to a viewing surface of an autostereoscopic display, wherein the autostereoscopic display includes optical units on the viewing surface configured to project views of wagering game content with an autostereoscopic, three-dimensional effect;

determining a distance of the player from the autostereoscopic display, wherein the distance is perpendicular to both the position of the player and the autostereoscopic display;

positioning a virtual camera rig centered at a position in virtual world space relative to the position of the player in the physical world space, wherein the virtual camera rig includes virtual cameras; and repeating, for each one of the optical units associated with the wagering game content, operations for determining, via analysis of the position of the player, that one of the views projected by the one of the optical units has a viewing angle that aligns with one of the virtual cameras on the virtual camera rig, and configuring the one of the virtual cameras to render a portion of the wagering game content that corresponds to the one of the optical units based on the viewing angle of the one of the views.

16. The one or more non-transitory, machine-readable storage media of claim 15, wherein the operations further comprise setting a frustum of each of the virtual cameras to portions of the autostereoscopic display on which the portion of the wagering game content is presented.

17. The one or more non-transitory, machine-readable storage media of claim 15, wherein the operation for determining that one of the views projected by the one of the optical units has the viewing angle that aligns with one of the virtual cameras on the virtual camera rig comprises:

determining that a first portion of the one of the views corresponds to the one of the virtual cameras;

determining that a second portion of the one of the views corresponds to an additional one of the virtual cameras that is adjacent to the one of the virtual cameras;

determining that the first portion corresponds to a central point of an aperture of the one of the virtual cameras and does not correspond to a central point of an aperture of the additional one of the virtual cameras; and selecting the one of the virtual cameras instead of the additional one of the virtual cameras in response to determining that the first portion corresponds to the central point of the aperture of the one of the virtual cameras.

18. The one or more non-transitory, machine-readable storage media of claim 15, wherein the operations further comprise:
determining a view width between the views at the distance of the player from the autostereoscopic display; and
spacing each of the virtual cameras on the virtual camera rig according to the view width.

19. A gaming apparatus comprising:
at least one input device configured to receive an indication of a wager to play a wagering game;
at least one autostereoscopic display device having optical units on a viewing surface configured to display views of wagering game content for the wagering game with an autostereoscopic three-dimensional effect using graphical autostereoscopic three-dimensional rendering of a three-dimensional world space;
a position detection device;
at least one processor; and
at least one memory device configured to store instructions which, when executed by the at least one processor, cause the gaming apparatus to,
determine, via scanning by the position detection device, a position of a player in physical world space at a distance from the viewing surface of the at least one autostereoscopic display device,
determine, via analysis of the position of the player, that one of the views has a viewing angle that that is closer in distance to the position of the player in the physical world space than any other viewing angles of any other ones of the views,
automatically construct a virtual camera at a position in virtual world space that corresponds to the position of the player in the physical world space for the graphical autostereoscopic three-dimensional rendering,
graphically present perspective projected geometry on a first axis of three-dimensional projection space for a portion of the wagering game content that corresponds to pixels of the at least one autostereoscopic display associated with the one of the optical units based on the position of the virtual camera associated with the one of the views having the viewing that is closer in distance to the position of the player, and
present, simultaneously, orthographic projected geometry for the portion of the wagering game content on a second axis of the three-dimensional projection space.

20. The gaming apparatus of claim 19, wherein the instruction to construct the virtual camera, when executed by the at least one processor, causes the gaming apparatus to utilize a perspective or off-axis perspective projection matrix with an orthographic or skew-orthographic component on the second axis.

21. The gaming apparatus of claim 20, wherein the instructions, when executed by the at least one processor, further cause the gaming apparatus to utilize a vertex shader configured to counteract perspective distortion on the second axis.

22. The gaming apparatus of claim 19, wherein the at least one memory device is configured to store instructions which, when executed by the at least one processor, further cause the gaming apparatus to
determine a plurality of virtual cameras that render adjacent regions of a virtual scene of the three-dimensional world space,
construct the virtual camera as a combination of the plurality of virtual cameras, and
configure the virtual camera to render the same virtual content as the combination of the plurality of virtual cameras.

23. A gaming apparatus comprising:
means for determining, via electronic scanning by a position detection device of the gaming apparatus, a position of a player in physical world space relative to a viewing surface of an autostereoscopic display, wherein the autostereoscopic display includes optical units on the viewing surface configured to project views of wagering game content with an autostereoscopic, three-dimensional effect;
means for determining, via electronic analysis of the position of the player, a distance of the player from the autostereoscopic display, wherein the distance is perpendicular to both the position of the player and the autostereoscopic display; and
means for repeating, for each one of the optical units associated with the wagering game content,
means for determining, via digital analysis of the position of the player, that one of the views projected by the one of the optical units has a viewing angle that is closer in distance to the position of the player than any other viewing angles of any other ones of the views,
means for automatically constructing a virtual camera at a location in virtual world space that corresponds to the position of the player in the physical world space at an intersection of a plane in a center of the one of the views and a line parallel to the top or bottom edge of the autostereoscopic display, and
means for configuring the virtual camera to graphically render, according to the viewing angle, a portion of the wagering game content that corresponds to pixels of the autostereoscopic display associated with the one of the optical units based on the location of the virtual camera associated with the one of the views having the viewing angle that is closer in distance to the position of the player.

24. The gaming apparatus of claim 23, further comprising, within the means for repeating, means for setting a frustum of the virtual camera to a width of the one of the optical units, wherein the width of the one of the optical units corresponds to the portion of the wagering game content.

25. The gaming apparatus of claim 24 further comprising:
means for constructing, according to multiple instances of the means for repeating, a plurality of virtual cameras associated with one view instance, wherein the plurality of virtual cameras render adjacent regions from the portion of the wagering game content;
means for constructing an additional virtual camera that combines the plurality of virtual cameras; and
means for configuring the virtual camera to render the portion of the wagering game content according to the additional virtual camera.

26. The method of claim 1, wherein the gaming system comprises one or more of a monetary input device configured to add monetary funds to a casino wagering game session balance, a wager placement device configured to wager a portion of wagering game funds from a casino wagering game session balance, or a rewards generation device configured to award rewards associated with a casino wagering game outcome to a casino wagering game session balance.

* * * * *